United States Patent [19]
Hirokane et al.

[11] Patent Number: 5,635,977
[45] Date of Patent: Jun. 3, 1997

[54] OPTICAL PROBE ELEMENT AND A RECORDING AND REPRODUCTION DEVICE USING THE OPTICAL PROBE ELEMENT

[75] Inventors: Junji Hirokane; Hiroyuki Katayama; Akira Takahashi, all of Nara, Japan

[73] Assignee: Sharp Kabushiki Kaisha, Osaka, Japan

[21] Appl. No.: 450,501

[22] Filed: May 26, 1995

Related U.S. Application Data

[62] Division of Ser. No. 247,644, May 23, 1994.

[30] Foreign Application Priority Data

May 24, 1993 [JP] Japan ................... 5-121710

[51] Int. Cl.[6] ............... B41J 2/47; G01D 15/34; G02B 26/00; G02B 27/00
[52] U.S. Cl. ............... 347/256; 347/241; 347/238; 347/257; 347/258; 347/262
[58] Field of Search .................. 347/257, 258, 347/262, 246, 248, 241, 238, 256; 250/116, 309, 310, 311

[56] References Cited

U.S. PATENT DOCUMENTS 5,294,790  3/1994  Ohta et al. .................... 250/216

*Primary Examiner*—Benjamin R. Fuller
*Assistant Examiner*—Raquel Yvette Gordon
*Attorney, Agent, or Firm*—David G. Conlin; Brian L. Michaelis

[57] ABSTRACT

An optical probe element for focusing light from a light source into micro light of a diameter not larger than the diffraction limit, includes a light transmitting flat substrate and an optical probe formed on one of the surfaces of the flat substrate. The optical probe has a substantially conical light transmitting projection, and a reflective film which covers the conical surface of the projection so that the tip of the projection is exposed. The optical probe element enables the optical probe to be formed on the flat substrate using a semiconductor processing technique, thereby achieving efficient mass production of a standardized optical probe element. Thus, a recording and reproduction apparatus using the optical probe element is efficiently mass-produced.

8 Claims, 19 Drawing Sheets

FIG.1
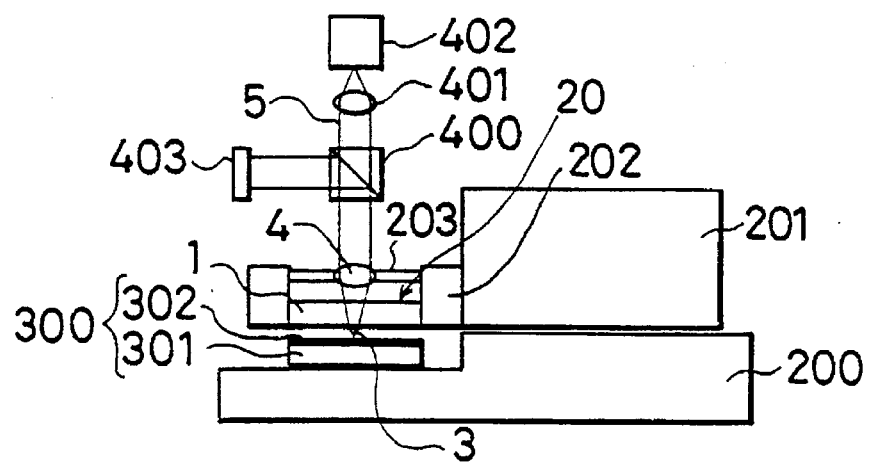
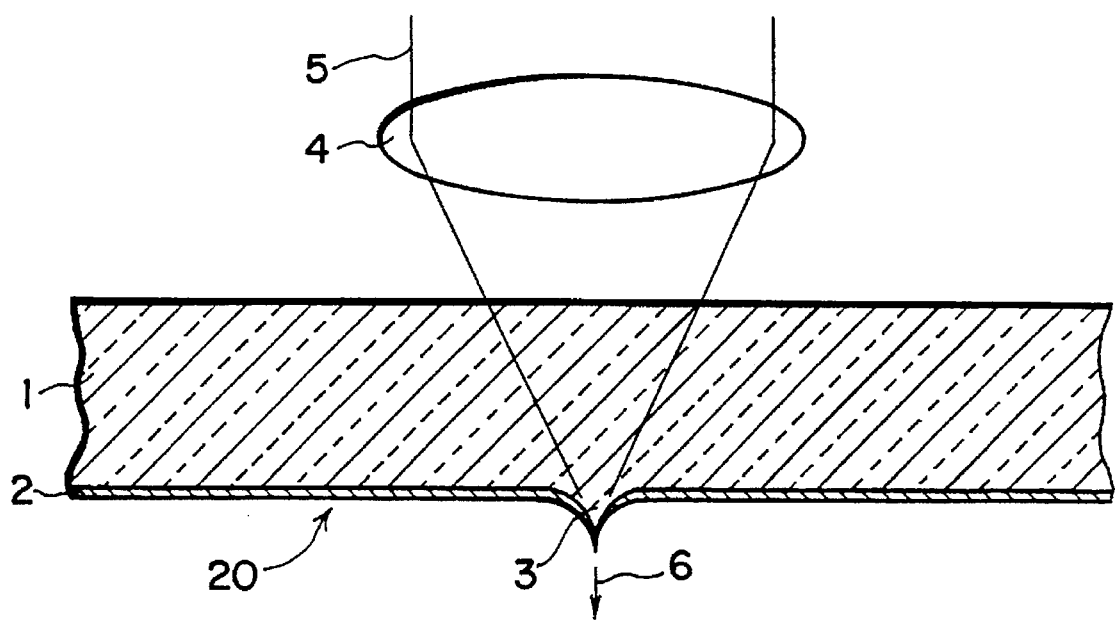
FIG. 2

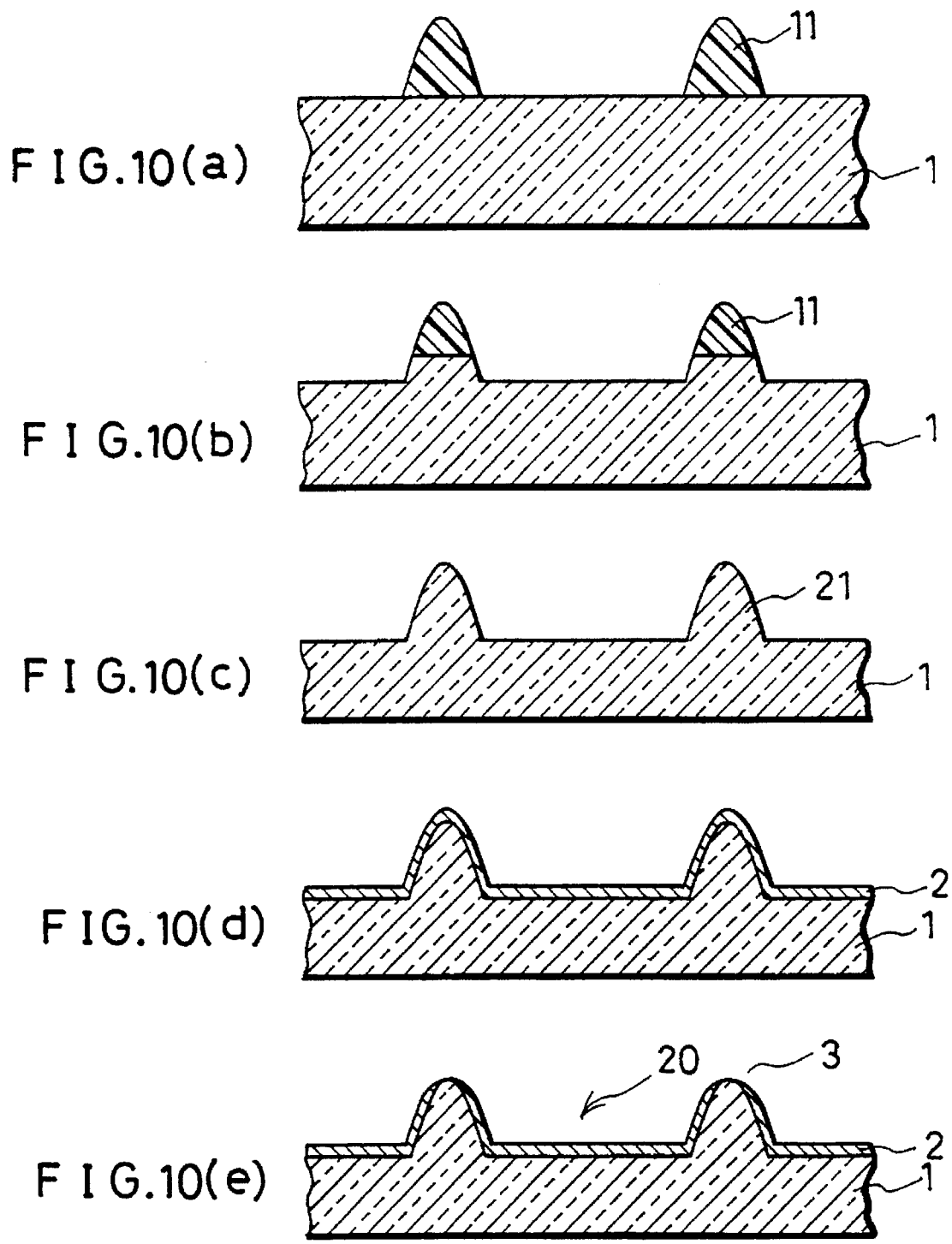

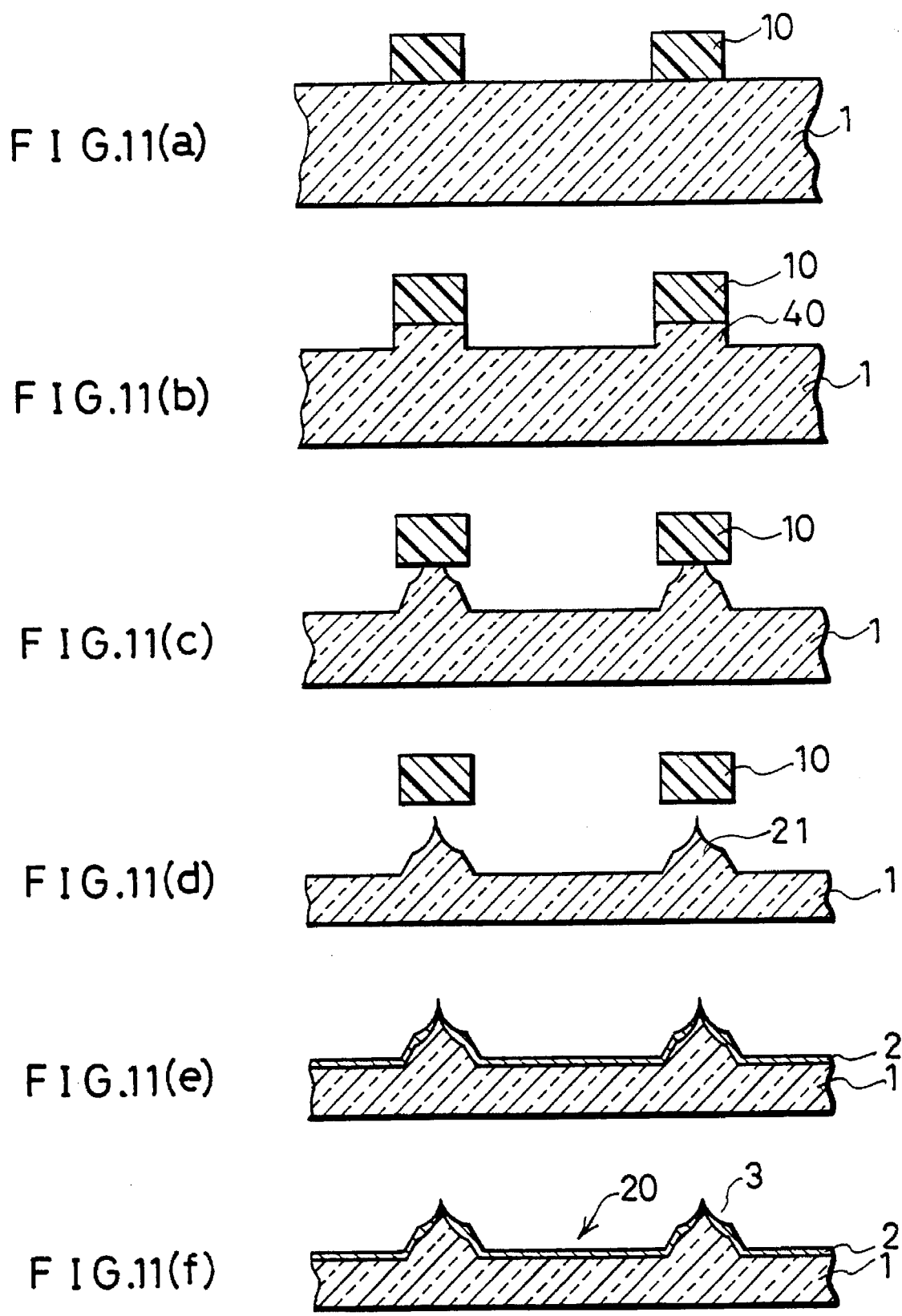

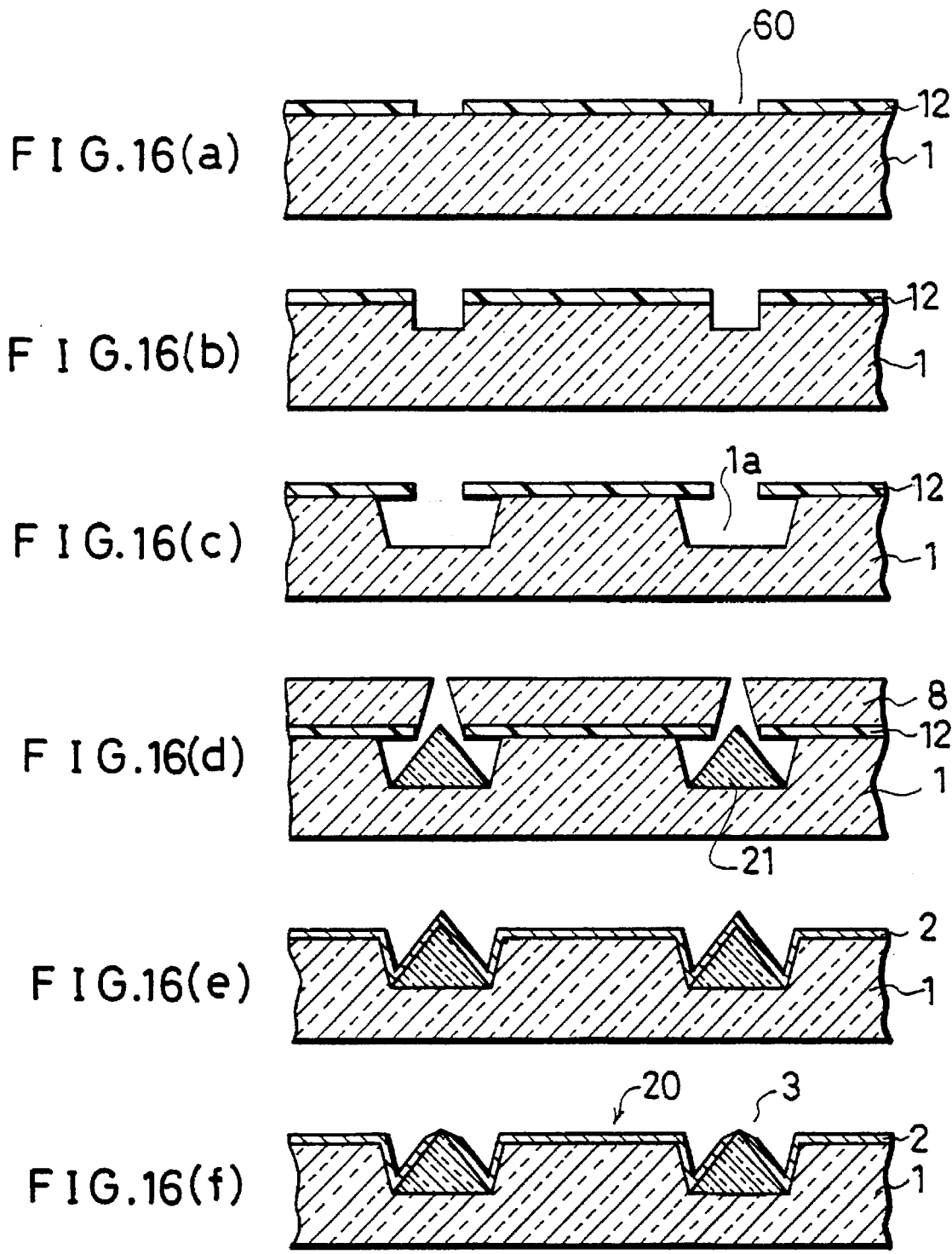

OPTICAL PROBE ELEMENT AND A RECORDING AND REPRODUCTION DEVICE USING THE OPTICAL PROBE ELEMENT

This is a Divisional Application of application Ser. No. 08/247,644, filed May 23, 1994.

FIELD OF THE INVENTION

The present invention relates to an optical probe element capable of focusing light into a size not larger than a diffraction limit, a recording and reproduction apparatus using the optical probe element, and a method of manufacturing the optical probe element.

BACKGROUND OF THE INVENTION

In recent years, a scanning tunneling microscope (STM), with which the surface states of materials are directly observed at atomic level, has been developed. Also, an atomic force microscope (AFM) and a magnetic force microscope (MFM) have been developed using the principle of STM. With these microscopes, a sharp-pointed probe and the surface of material are positioned close to each other so as to detect a tunnel current flowing between them, and an atomic force and a magnetic force working between them. A photon STM, which causes light to fall on a sample surface using a sharp-pointed optical probe and detects evanescent light overflown from the sample surface, is developed by using the principle of STM.

Various apparatuses for recording and reproducing information at atomic level by using the principle of STM are proposed. Another proposed apparatus focuses light into a size not larger than the diffraction limit using the principle of the photon STM, records information with the focused light and reproduces the information by detecting reflected light, transmitted light, or evanescent light from a substance recorded (for example, see Applied Physics, Letter 61(2), 13 Jul. 1992, page 142).

FIG. 27 illustrates a recording and reproduction apparatus using an optical probe.

An optical probe 803 is formed at an end of an optical fiber 800. The optical fiber 800 is fixed to a movable supporting section 822. The supporting section 822 is moved by a driving section 821. The driving section 821 and a recording medium 810 are fixed on a base 820. The optical probe 803 is moved to a desired location on the recording medium 810 by driving the supporting section 822 by the driving section 821.

The recording medium 810 is constructed by a transparent substrate 811, and a recording layer 812 formed on the transparent substrate 811. The optical probe 803 is positioned so that its tip is located close to the recording layer 812.

When recording information, light whose intensity has been modulated according to the information is directed to the optical fiber 800, and focused into a size which is not larger than the diffraction limit by the optical probe 803. Thus, high-density recording of information on the recording layer 812 is achieved.

A method of manufacturing the optical probe 803 is illustrated in FIGS. 28(a) to 28(c).

As illustrated in FIG. 28(a), the optical fiber 800 is heated until part thereof is fused. In this state, the optical fiber 800 are pulled in the right and left directions as shown in FIG. 28(b). Then, a red heated section 801 of the optical fiber 800 is split as shown in FIG. 28(c), thereby producing the sharp-pointed optical probe 803.

With a conventional structure, however, it is difficult to make the tip of the optical probe 803 having a uniform diameter. Hence, the conventional structure does not allow mass-production of the standardized optical probe 803.

Moreover, with the conventional structure, when recording and reproducing a plurality of pieces of information simultaneously using a bundle of optical probes 803, the distance between each of the optical probes 803 and the recording medium 810 can hardly be kept uniform.

SUMMARY OF THE INVENTION

It is an object of the present invention to provide a standardized optical probe element which can be efficiently manufactured by mass production.

In order to achieve the above object, an optical probe element of the present invention includes a light transmitting flat substrate, an optical probe formed on one of the surfaces of the flat substrate, a substantially conical light transmitting projection, and a reflective film which is formed to cover the conical surface of the projection so that the tip of the projection is exposed.

With this structure, it is possible to form the optical probe on the flat substrate by using a semiconductor processing technique. Consequently, the standardized optical probe element is efficiently mass-produced.

Another object of the present invention is to provide a manufacturing method of the optical probe element.

In order to achieve the above object, a manufacturing method of an optical probe element of the present invention includes the steps of forming a mask by a photoresist on a portion of one of the surfaces of a flat substrate on which an optical probe is to be formed, removing the mask and forming a substantially conical projection by isotropy-etching the surface of the flat substrate on which the mask is formed, forming a reflective film on the conical surface of the projection, and removing the reflective film from the tip of the projection.

This method allows efficient mass production of the optical probe element.

Still another object of the present invention is to provide a recording and reproduction apparatus using the optical probe element.

In order to achieve the above object, a recording and reproduction apparatus of the present invention includes a light source, and the optical probe element which records and reproduces information by focusing light from the light source into micro light spot of a diameter not larger than a diffraction limit and projecting the micro light spot onto a recording medium.

This structure allows efficient mass production of the recording and reproduction apparatus.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory view illustrating a schematic structure of a recording and reproduction apparatus according to one embodiment of the present invention.

FIG. 2 is an explanatory view illustrating a schematic structure of an optical probe element in the recording and reproduction apparatus of FIG. 1.

FIGS. 10(a) to 10(e) are views illustrating processes in another method of manufacturing the optical probe element of FIG. 2.

FIGS. 11(a) to 11(f) are views illustrating processes in still another method of manufacturing the optical probe element of FIG. 2.

FIGS. 16(a) to 16(f) are views illustrating processes in another method of manufacturing the optical probe element of FIG. 14.

DESCRIPTION OF THE EMBODIMENTS

Figure 3:
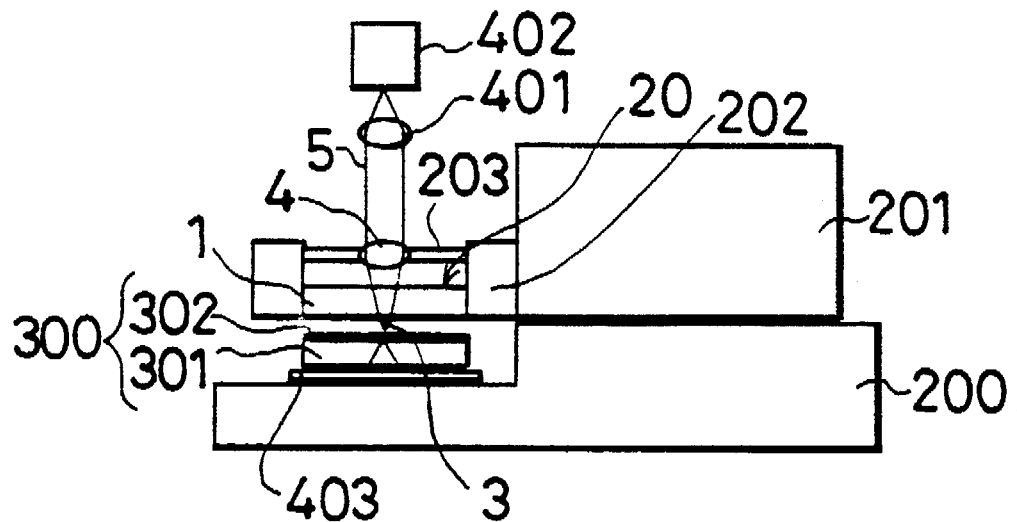
FIG. 3 is an explanatory view illustrating a variation of the recording and reproduction apparatus of FIG. 1.

The following description discusses a first embodiment of the present invention with reference to FIGS. 1 to 16.

As illustrated in FIG. 1, a recording and reproducing apparatus of this embodiment includes a light source 402, a collimating lens 401 for producing a parallel beam 5 from light from the light source 402, an optical probe element 20 having an optical probe 3, a converging lens 4 for converging the parallel beam 5 on the optical probe 3, and a supporting section 202 on which the converging lens 4 and the optical probe element 20 are mounted.

The recording and reproduction apparatus further includes (1) a driving section 201 for moving the supporting section 202, (2) a base 200 on which the driving section 201 and a recording medium 300 are fixed, (3) a beam splitter 400 which is located on a light path between the collimating lens 401 and the converging lens 4, allows the parallel beam 5 from the collimating lens 401 to path through and reflects light reflected by the recording medium 300, and (4) a photodetector 403 for detecting the light reflected by the beam splitter 400.

The recording medium 300 is constructed by a transparent substrate 301 and a recording layer 302 formed on the transparent substrate 301, and fixed on the base 200 so that the recording layer 302 faces up. The optical probe 3 is positioned so that its tip is located close to the recording layer 302.

As illustrated in FIG. 2, the optical probe element 20 is constructed by a light transmitting flat substrate 1, the substantially conical light transmitting optical probe 3 formed to stick out from a surface of the flat substrate 1, and a reflective film 2 which is formed on the surface of the flat substrate 1 where the optical probe 3 is formed so that the tip of the optical probe 3 is exposed. The diameter of the exposed portion of the tip of the optical probe 3 is the order of nm.

With this structure, when recording information on the recording medium 300 shown in FIG. 1, first, the intensity of light from the light source 402 is modulated according to the information. The modulated light is converted into the parallel beam 5 by the collimating lens 401, passes through the beam splitter 400, and is converged on the optical probe 3 by the converging lens 4.

As illustrated in FIG. 2, the converged light passes through the flat substrate 1 of the optical probe element 20, falls upon the optical probe 3, and is then focused into a size of a diameter not larger than the diffraction limit. Namely, the converged light is converged into a size of a diameter close to the diameter (the order of run) of the exposed portion of the tip of the optical probe 3.

Micro light 6 produced by the optical probe 3 is projected onto the recording layer 302 of the recording medium 300 shown in FIG. 1. The temperature of a portion exposed to the micro light 6 is increased according to the intensity of the micro light 6.

If the recording layer 302 is made from a phase-change-type material, the structure changes according to the information. If the recording layer 302 is made from a magnetic material, the magnetization state changes according to the information. Thus, the information is recorded on the recording layer 302.

The information is reproduced by the reflected light from the recording medium 300 as follows.

First, light whose intensity is uniform and lower than that of the light used for recording information is emitted by the light source 402. Similar to the above-mentioned manner, the micro light 6 obtained by the optical probe 3 is projected onto the recording layer 302 of the recording medium 300.

When the reflected light from the recording layer 302 is taken by the optical probe 3, the divergent light is produced. The divergent light is then converged by the converging lens 4. The converged light is reflected by the beam splitter 400 and directed to the Photodetector 403. In the photodetector 403, the intensity or the rotatory polarization of the reflected light from the recording layer 302 is detected and converted into an electric signal. The information is reproduced according to the electric signal.

As described above, in the recording and reproduction apparatus of this embodiment, since the micro light 6 from the optical probe 3 shown in FIG. 2 is used, it is possible to record and reproduce information in a region of the order of nm.

The following description discusses variations of the recording and reproduction apparatus of FIG. 1 (hereinafter designated as $A_1$). An alphabetic character with a subscript is given to each variation.

As illustrated in FIG. 3, in a recording and reproduction apparatus ($A_2$), the photodetector 403 is disposed on a side of the recording medium 300 opposite to the flat substrate 1 side and detects light transmitted through the recording medium 300 to reproduce information. With this arrangement, it is possible to omit the beam splitter 400 which is an essential component in the recording and reproduction apparatus ($A_1$), resulting in a simplified structure.

Figure 4:
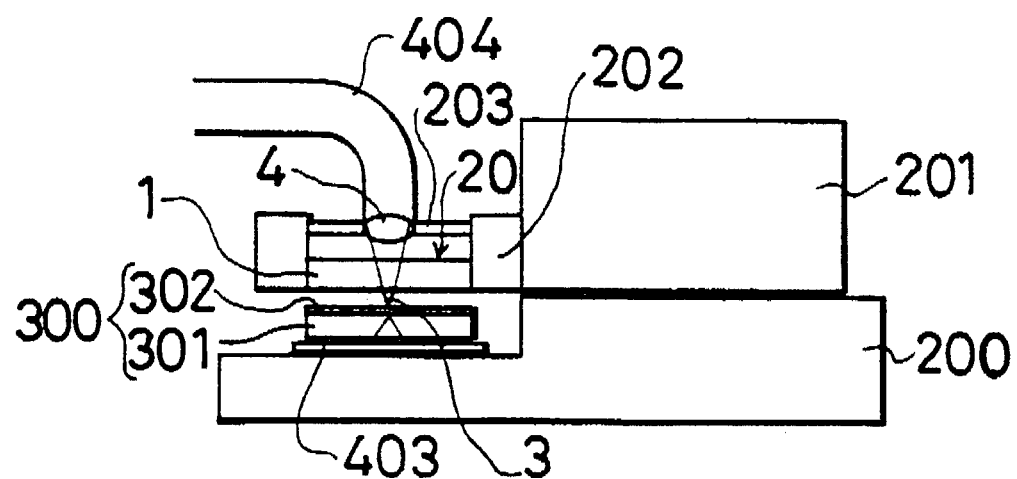
FIG. 4 is an explanatory view illustrating another variation of the recording and reproduction apparatus of FIG. 1.

A recording and reproduction apparatus ($A_3$) reproduces information by detecting light which has been transmitted through the recording medium 300 like in the recording and reproduction apparatus ($A_2$). However, as shown in FIG. 4, in the recording and reproduction apparatus ($A_3$), instead of the light from the light source 402, light from an optical fiber 404 is directly guided to the converging lens 4. It is thus possible to omit the collimating lens 401 which is an essential component in the recording and reproduction apparatus ($A_2$), and thereby achieving a further simplified structure.

Figure 5:
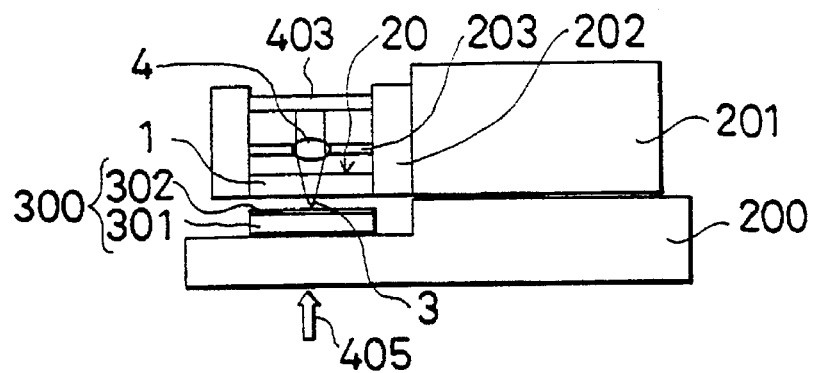
FIG. 5 is an explanatory view illustrating still another variation of the recording and reproduction apparatus of FIG. 1.

A reproduction apparatus ($A_4$) reproduces information by detecting light which has been transmitted through the recording medium 300 like in the recording and reproduction apparatuses ($A_2$) and ($A_3$). However, as shown in FIG. 5, in the reproduction apparatus ($A_4$), the base 200 is made from a light transmitting material and light 405 is uniformly applied to the entire area of the recording medium 300 from the base 200 side. The photodetector 403 is disposed on a surface of the converging lens 4 opposite to the surface on which the optical probe element 20 is positioned. When the uniform light 405 is applied to the entire area of the recording medium 300, the light which has been transmitted through the recording medium 300 is picked up by the optical probe 3 and information is reproduced. This structure is more simplified than the structures of the recording and reproduction apparatuses ($A_1$) to ($A_3$) in which micro light is needed to be incident on the recording medium 300.

Figure 6:
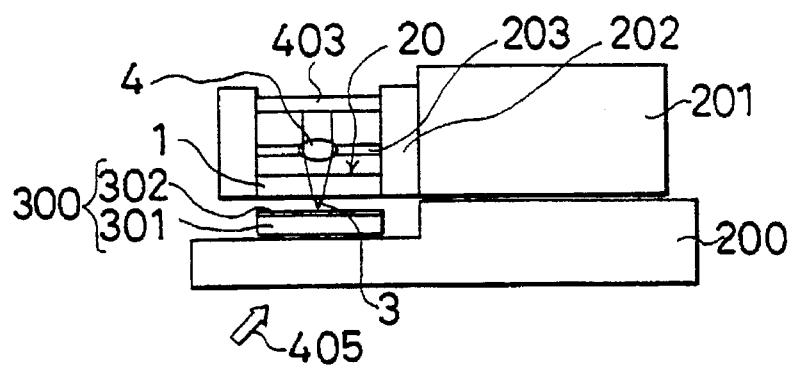
FIG. 6 is an explanatory view illustrating still another variation of the recording and reproduction apparatus of FIG. 1.

A reproduction apparatus ($A_5$) employs a reproduction method different from that of the recording and reproduction apparatuses ($A_1$) to ($A_3$) and the reproduction apparatus ($A_4$), and reproduces information by detecting evanescent light overflown from the recording medium 300. More specifically, as shown in FIG. 6, the incident angle is determined so that the light 405 of uniform intensity incident on the recording medium 300 is totally reflected by the recording medium 300. The light 405 of uniform intensity is applied to the entire surface of the recording medium 300, and then totally reflected by the recording medium 300. At this time, evanescent light overflows from the recording medium 300. Information is reproduced by detecting the evanescent light. Thus, similarly to the reproduction apparatus ($A_4$), the reproduction apparatus ($A_5$) has a simplified structure.

Figure 7:
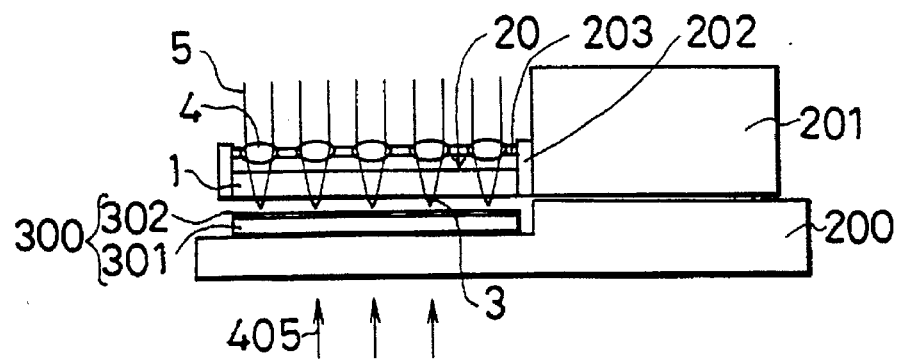
FIG. 7 is an explanatory view illustrating still another variation of the recording and reproduction apparatus of FIG. 1, wherein an optical probe element is formed by a plurality of optical probes.
Figure 8:
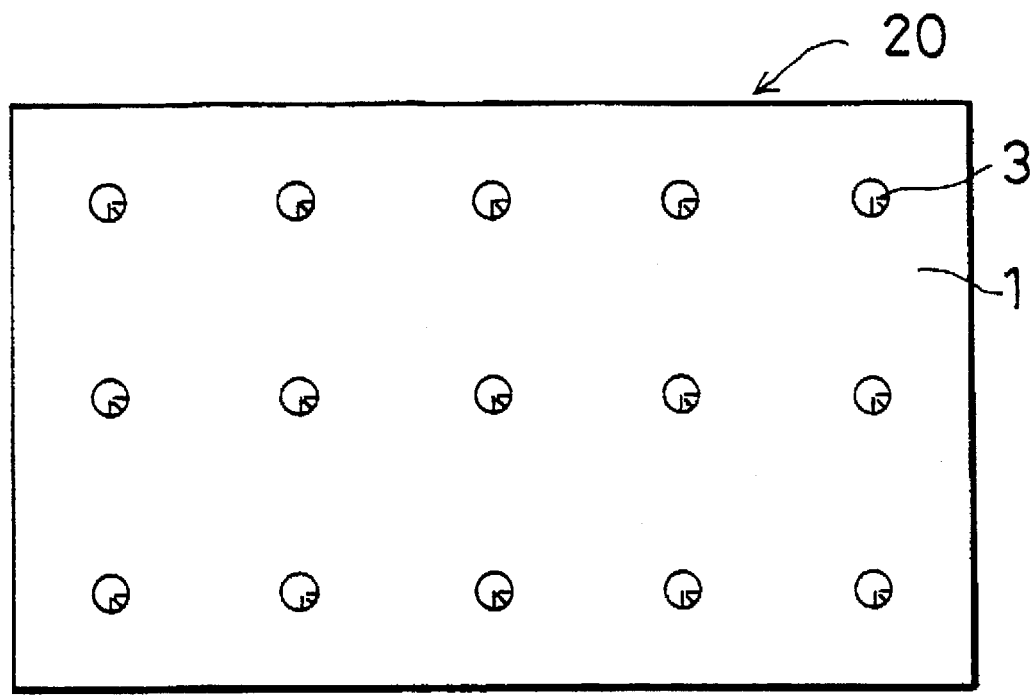
FIGS. 8(a) and 8(b) are explanatory views illustrating a schematic structure of the optical probe element in the recording and reproduction apparatus of FIG. 7, FIG. 8(a) being a plan view and FIG. 8(b) being a front view.
Figure 8:
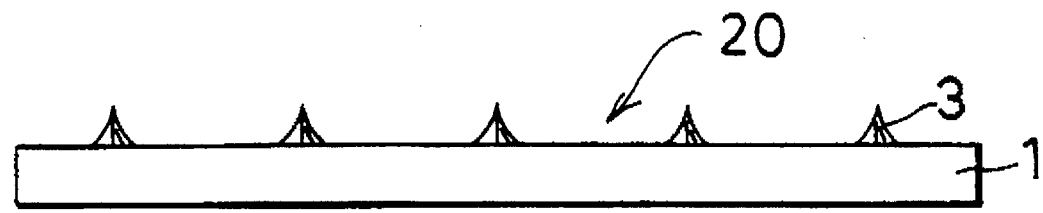

As illustrated in FIG. 7, a recording and reproduction apparatus ($A_6$) has the same structure as the recording and reproduction apparatus ($A_1$). However, the optical probe element 20 in the recording and reproduction apparatus ($A_6$) has a plurality of optical probes 3.

As shown in FIGS. 8(a) and 8(b), in the optical probe element 20, the plurality of optical probes 3 are two-dimensionally arranged on one of the surfaces of the flat substrate 1.

With this structure, since information is recorded and reproduced using one of the optical probes 3 closest to a portion on the recording medium 300 of FIG. 7 which is desired to be accessed, high-speed recording and reproduction are achieved. This structure also allows simultaneous recording, simultaneous reproduction, and simultaneous recording and reproduction on a plurality of portions of the recording medium 300, thereby achieving recording and reproduction at higher speeds.

Next, a method of manufacturing the optical probe element 20 is discussed. There are some variations in the manufacturing method, and each variation is indicated by an alphabetic character with a subscript.

Figure 9A:
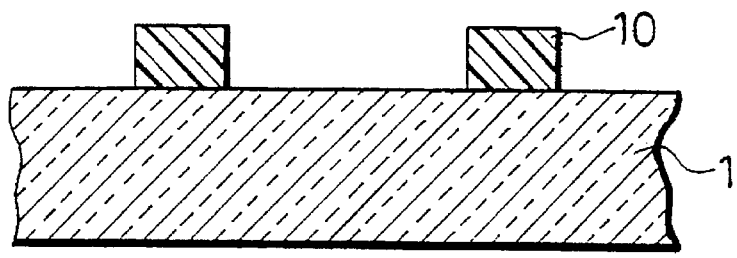
FIGS. 9(a) to 9(e) are views illustrating processes in a manufacturing method of the optical probe element of FIG. 2.
Figure 9B:
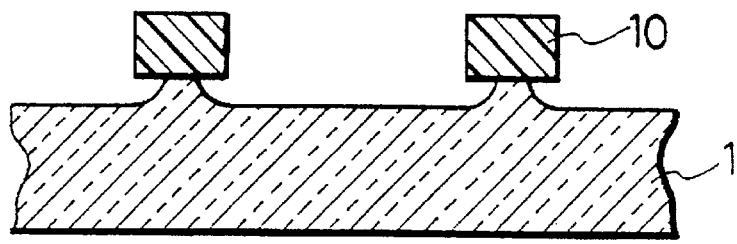
Figure 9C:
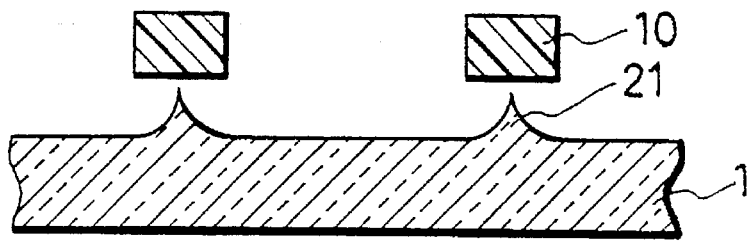

With a manufacturing method ($P_{11}$), as illustrated in FIGS. 9(a) to 9(e), a mask 10 is formed by a photoresist on a portion of the flat substrate 1 on which the optical probe 3 is to be formed (see FIG. 9(a)). As to be described below, the diameter of the mask 10 is between 4 and 20 μm. Next, isotropy etching of the flat substrate 1 is performed (see FIGS. 9(b) and 9(c)). The flat substrate 1 under the mask 10 is under-etched, and thus the mask 10 is separated. As a result, a substantially conical sharp-pointed projection 21 is formed on the flat substrate 1.

Figure 9D:
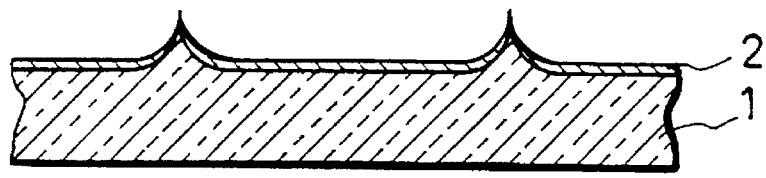

Next, a reflective film 2 is formed on the surface of the flat substrate i whereupon the projection 21 is formed (see FIG. 9(d)). Then, the reflective film 2 on the tip of the projection 21 is removed (see FIG. 9(e)) by a method to be described later. The optical probe 3 is thus formed on the flat substrate 1. As described above, the manufacturing method ($P_{11}$) enables efficient mass-production of the optical probe element 20.

The removal of the reflective film 2 from the tip of the projection 21 is performed by one of the following three methods or a combination thereof.

With a removing method ($E_1$), light with a high intensity is applied to the projection 21 from the flat substrate 1 side. This causes the reflective film 2 on the tip of the projection 21 to evaporate.

With a removing method ($E_2$), the projection 21 is positioned close to an electric conductor. An electric current having a large value sufficient for temporarily causing a field emission is arranged to flow repeatedly while controlling the distance between the projection 21 and the conductor by detecting a tunnel current flowing between them. Consequently, the reflective film 2 on the tip of the projection 21 evaporates.

With a removing method ($E_3$), electrolytic etching is performed. With this method, since electric fields gather at the end of the projection 21, only the tip is etched.

With the removing methods ($E_1$) to ($E_3$), the process of removing the reflective film 2 from the tip of the projection 21 of the optical probe element 20 is easily performed during the manufacture of the optical probe element 20.

With the manufacturing method ($P_{11}$), in order to efficiently focus light by the optical probe 3, it is desirable that a surface of the mask 10 which is in contact with the flat substrate 1 has a circular shape. Additionally, in order to produce the optical probe 3 which can perfectly receive the light focused by the converging lens 4 (see FIG. 2), it is desirable that the surface of the mask 10 in contact with the flat substrate 10 has a diameter of 4 to 20 µm.

In the case when glass such as quarts glass and aluminosilicate glass is used as the flat substrate 1, it is desirable to perform isotropy etching by wet etching using buffer hydrofluoric acid made of a mixture of hydrofluoric acid and ammonium fluoride.

If an electrically conductive metal film (for example, Au, Ag, Pt, W) is formed instead of the reflective film 2, and if the metal film on the tip of the projection 21 is not removed, the probe is used in STM and AFM. Meanwhile, if a magnetic film (for example, FeNi, FeAlSi, CoTi) is formed instead of the reflective film 2, and if the magnetic film on the tip of the projection 21 is not removed, the probe is used in MFM.

A specific example of the manufacturing method ($P_{11}$) is discussed below.

The mask 10 was formed by a photoresist in the shape of a circle with a thickness of 1 µm and a diameter of 10 µm on one of the surfaces of the flat substrate 1 made of aluminosilicate glass. The projection 21 was formed by performing isotropy etching by wet etching using buffer hydrofluoric acid made of a mixture of hydrofluoric acid and ammonium fluoride. Then, the reflective film 2 of W (tungsten) was formed. The reflective film 2 on the tip of the projection 21 was removed by performing electrolytic etching by applying a voltage to the reflective film 2 in a KOH solution. As a result, the optical probe 3 having an opening with a diameter of about 10 nm at the end of the projection 21 was obtained.

Recording and reproduction tests were performed by setting the optical probe element 20 in the recording and reproduction apparatus shown in FIG. 1. In this embodiment, the recording layer 302 is made from a phase-change-type material whose structure changes according to information. Therefore, when the recording layer 302 receives light for recording the information, the portion exposed to the light is crystallized.

An amorphous InSbTe with a film thickness of 40 nm was used as the recording layer 302 of the recording medium 300. Pulses of laser light of 5 mW were guided from the light source 402 formed by a semiconductor laser by the optical probe 3, and projected onto the recording medium 300 while moving the optical probe 3 by the driving section 201. As a result, crystalline regions were discontinuously formed on the recording layer 302. The size of each region was around 10 nm, i.e., substantially equal to the diameter of the opening of the optical probe 3. The result shows that the optical probe 3 enables high-density recording of information.

Next, a laser of uniform intensity of 1 mW was guided by the optical probe 3 and scanned along the crystalline regions. As a result, a pulse signal was obtained by the photodetector 403. Namely, the pulse signal was obtained because the reflection factor varies between the amorphous region and the crystalline region. The result shows that the optical probe 3 can satisfactorily reproduce information recorded at high density.

Thus, as shown in FIG. 1, the recording and reproduction apparatus includes the light source 402 and the optical probe element 20 for focusing light from the light source 402 into the micro light 6 having a diameter not larger than the diffraction limit, and records and reproduces information by projecting the micro light 6 onto the recording medium 300 as shown in FIG. 2. The optical probe element 20 includes: (1) the light transmitting flat substrate 1; and (2) the optical probe 3 formed on the flat substrate 1. The optical probe 3 has: (a) a substantially conical light transmitting projection which is formed on one of the surfaces of the flat substrate 1 to stick out from the surface; and (b) the reflective film 2 formed on the conical surface of the projection so that the end of the projection is exposed. This structure enables efficient mass-production of the recording and reproduction apparatus capable of recording information at high density.

With a manufacturing method ($P_{12}$), first, a mask is formed by a photoresist on a portion of the flat substrate 1 whereupon the optical probe 3 is to be formed. Then, the substrate is post-baked at a temperature not lower than the temperature at which the photoresist deforms. As illustrated in FIG. 10(a), a substantially conical sharp-pointed mask 11 is formed due to the tensile strength between the photoresist and the flat substrate 1.

Anisotropy etching is performed until the mask 11 disappears (see FIGS. 10(b) and 10(c)). As a result, the substantially conical sharp-pointed projection 21 like the mask 11 is formed.

Figure 9E:
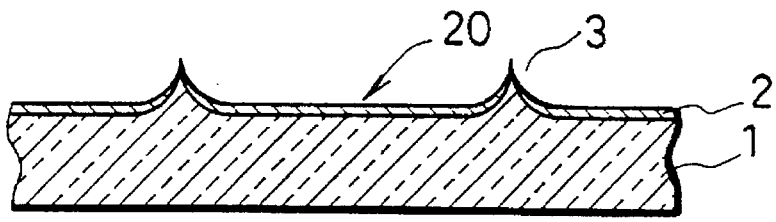
Figure 12A:
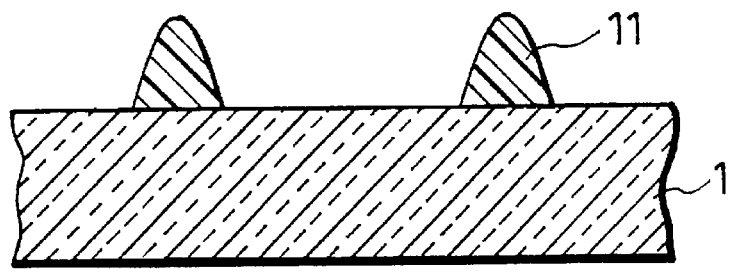
FIGS. 12(a) to 12(e) are views illustrating processes in still another method of manufacturing the optical probe element of FIG. 2.
Figure 12B:
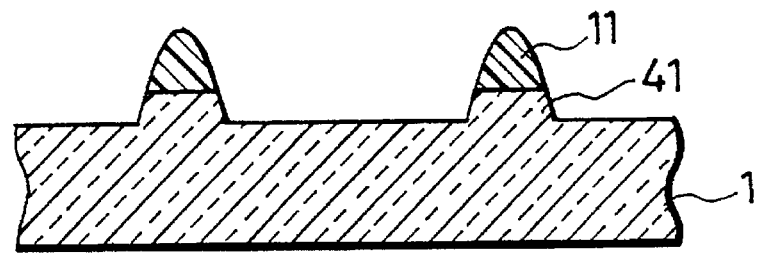
Figure 12C:
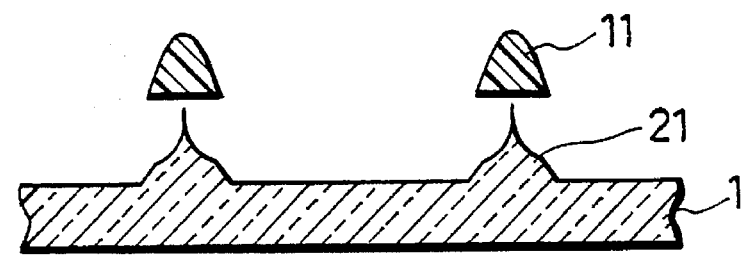
Figure 12D:
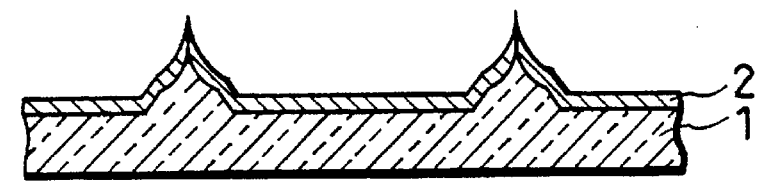
Figure 12E:
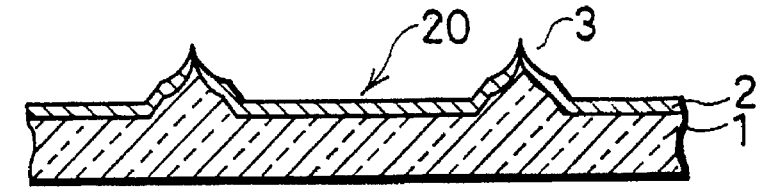
Figure 13A:
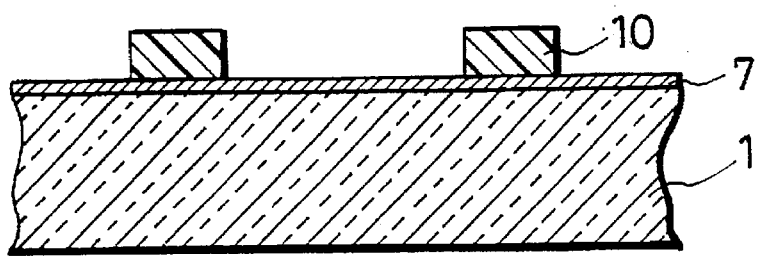
FIGS. 13(a) to 13(f) are views illustrating processes in still another method of manufacturing the optical probe element of FIG. 2.
Figure 13B:
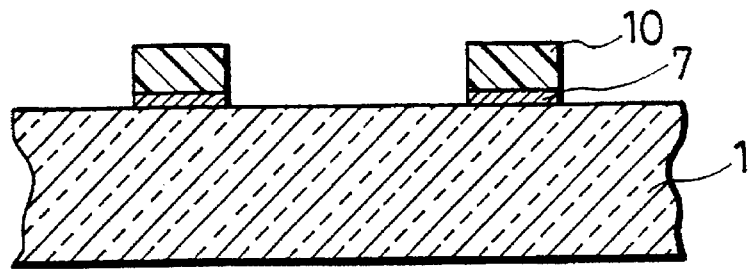
Figure 13C:
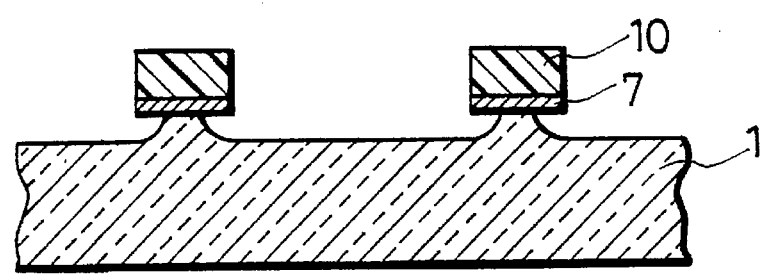
Figure 13D:
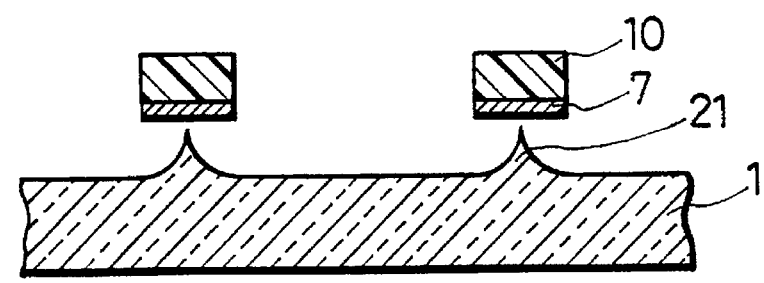
Figure 13E:
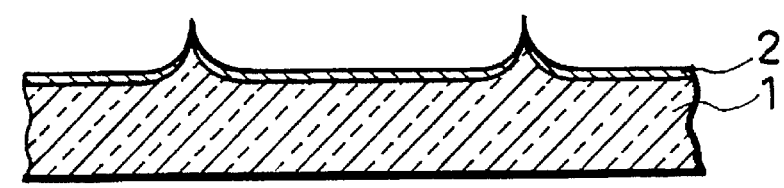
Figure 13F:
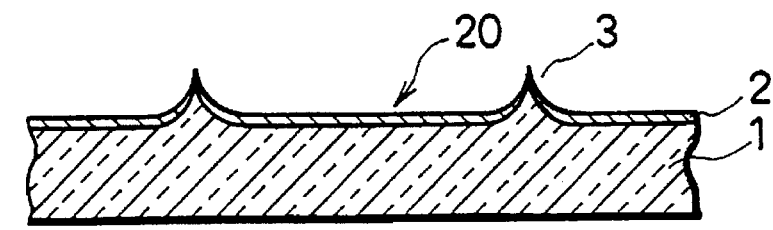

The subsequent processes shown in FIGS. 10(d) to 10(e) are identical to the processes shown in FIGS. 9(d) to 9(e) of the manufacturing method ($P_{11}$). Through these processes, the optical probe 3 is formed on the flat substrate 1. As described above, the manufacturing method ($P_{12}$) enables efficient mass-production of the optical probe element 20.

In the case when glass such as quarts glass and aluminosilicate glass is used, it is desirable to perform anisotropy etching by dry etching using $CF_4$, $CHF_3$.

A specific example of the manufacturing method ($P_{12}$) is discussed below.

A mask in the shape of a circle having a thickness of 5 µm and a diameter of 5 µm was formed by a photoresist on one of the surfaces of the flat substrate 1 made of quarts glass. Baking was performed for 30 minutes by raising the temperature of the mask to 150° C. which is not lower than the temperature at which the photoresist deforms. The mask was then shaped into the substantially conical sharp-pointed mask 11. Next, the projection 21 was formed by performing dry etching using $CF_4$ until the mask 11 disappeared. Then, the reflective film 2 of W (tungsten) was formed. Electrolytic etching was performed in a KOH solution. As a result, the optical probe 3 having an opening with a diameter of about 20 nm at the end of the projection 21 was obtained.

Recording and reproduction tests were performed by setting the optical probe element 20 in the recording and reproduction apparatus shown in FIG. 3. The test conditions were the same as those mentioned above. As a result, a crystalline region of about 20 nm was formed during recording. During reproduction, a pulse signal was obtained as the transmitting rate varied between the amorphous region and the crystalline region. The result shows that the optical probe 3 achieves high-density recording and reproduction of information.

With a manufacturing method ($P_{13}$), as illustrated in FIGS. 11($a$) to 11($f$), the mask 10 is formed by a photoresist on a portion of the flat substrate 1 whereupon the optical probe 3 is to be formed (see FIG. 11($a$)). Then, anisotropy etching is performed (see FIG. 11($b$)). The manufacturing methods ($P_{11}$) and ($P_{13}$) differ from each other on this point. Since only exposed portions of the surface of the flat substrate 1 which are not covered with the mask 10 are etched, a raised portion 40 is created on the flat substrate 1.

The subsequent processes shown in FIGS. 11($c$) to 11($f$) are identical to the processes shown in FIGS. 9($d$) to 9($e$) of the manufacturing method ($P_{11}$).

With the manufacturing method ($P_{13}$), since the projection 21 is formed on the a raised portion 40, the tip of the projection 21 becomes sharper than that of the projection 21 formed by the manufacturing method ($P_{11}$). It is thus possible to reduce the size of the opening at the end of the optical probe 3. Consequently, the optical probe element 20 including the optical probe 3 having a smaller opening at the end thereof is manufactured.

A specific example of the manufacturing method ($P_{13}$) is discussed below.

The mask 10 in the shape of a circle having a thickness of 5 µm and a diameter of 5 µm was formed by a photoresist on one of the surfaces of the flat substrate 1 made of quarts glass. The raised portion 40 with a height of about 4 µm was formed by dry etching the exposed flat substrate 1 using $CF_4$. Next, the projection 21 was formed by performing isotropy etching by wet etching using buffer hydrofluoric acid. Then, the reflective film 2 of W (tungsten) was formed. The reflective film 2 on the tip of the projection 21 was removed by performing electrolytic etching in a KOH solution while applying a voltage to the reflective film 2. As a result, the optical probe 3 having an opening with a diameter of about 5 nm at the end of the projection 21 was obtained.

Recording and reproduction tests were performed by setting the optical probe element 20 in the recording and reproduction apparatus shown in FIG. 1. The tests were conducted under the same test conditions as those mentioned above. However, the recording layer 302 with a thickness of 20 nm was used. As a result, a crystalline region of about 5 nm was formed, and satisfactorily recorded and reproduction were achieved.

With a manufacturing method ($P_{14}$), as illustrated in FIG. 12($a$), the substantially conical sharp-pointed mask 11 is created in a portion of the flat substrate 1 whereupon the optical probe 3 is to be formed in the same manner as described in the manufacturing method ($P_{12}$).

The subsequent processes shown in FIGS. 12($b$) to 12($e$) are identical to the processes shown in FIGS. 11($b$) to 11($f$) of the manufacturing method ($P_{13}$).

With the manufacturing method ($P_{14}$), since the projection 21 is formed on a conical trapezoid portion 41, the projection 21 has a smoother conical surface than that of the projection 21 produced by the manufacturing method ($P_{13}$). It is thus possible to more efficiently guide the light to the tip of the optical probe 3.

A specific example of the manufacturing method ($P_{14}$) is discussed below.

A mask in the shape of a circle with a thickness of 5 µm and a diameter of 5 µm was formed by a photoresist on one of the surfaces of the flat substrate 1 made of quarts glass. Baking was performed for 30 minutes by raising the temperature of the mask to 150° C. which is not lower than a temperature at which the photoresist deforms. Then, the mask was shaped into the substantially conical sharp-pointed mask 11. Next, the a raised portion 41 with a height of about 4 µm was formed by performing dry etching using $CF_4$. The projection 21 was formed by performing isotropy etching by wet etching using buffer hydrofluoric acid. The reflective film 2 of W (tungsten) was formed. The reflective film 2 on the tip of the projection 21 was removed by performing electrolytic etching in a KOH solution while applying a voltage to the reflective film 2. As a result, the optical probe 3 having an opening with a diameter of about 5 nm at the tip of the projection 21 was obtained.

Recording and reproduction tests were performed by setting the optical probe element 20 in the recording and reproduction apparatus shown in FIG. 3. The test conditions were the same as those mentioned above. Here, the recording layer 302 with a film thickness of 20 nm was used. As a result, a crystalline region of about 5 nm was formed, and satisfactory recording and reproduction were performed.

Unlike the manufacturing method ($P_{11}$), with a manufacturing method ($P_{15}$), as illustrated in FIGS. 13($a$) to 13($f$), an adhesion reinforced layer 7 is formed on the flat substrate 1, and the mask 10 is created on a portion of the flat substrate 1 whereupon the optical probe 3 is to be formed (see FIG. 13($a$)).

Then, exposed portions of the adhesion reinforced layer 7 are removed by etching (see FIG. 13($b$)). The subsequent processes shown in FIGS. 13($c$) to 13($f$) are identical to the processes shown in FIGS. 9($b$) to 9($e$) of the manufacturing method ($P_{11}$).

With the manufacturing method ($P_{15}$), the mask 10 is hard to separate from the flat substrate 1 as the adhesion reinforced layer 7 is formed between the flat substrate 1 and the mask 10. Therefore, the projection 21 is certainly produced.

It is desirable to use a material which can never be etched in the process of isotropy-etching the flat substrate 1 (see FIG. 13($c$)). For example, if glass is used for the flat substrate 1 and if isotropy etching is performed by wet etching using buffer hydrofluoric acid, it is desirable to form the adhesion reinforced layer 7 by materials such as Ta, Au, and Pt which can not be etched by buffer hydrofluoric acid. However, the materials for the adhesion reinforced layer 7 are not particularly limited to those mentioned above, and any material can be used if it is harder to be etched than the flat substrate 1.

A specific example of the manufacturing method ($P_{15}$) is discussed below.

The adhesion reinforced layer 7 with a thickness of 50 nm was formed by Ta on one of the surfaces of the flat substrate 1 made of aluminosilicate glass. Then, the mask 10 was produced in the shape of a circle having a thickness of 1 µm and a diameter of 10 µm by a photoresist. Next, exposed portions of the adhesion reinforced layer 7 were removed by dry etching using $CF_4$. The projection 21 was formed by performing isotropy etching by wet etching using buffer hydrofluoric acid. The reflective film 2 of W (tungsten) was formed. The reflective film 2 on the tip of the projection 21 was removed by performing electrolytic etching in a KOH solution while applying a voltage to the reflective film 2. As a result, the optical probe 3 having an opening with a diameter of about 10 nm at the tip of the projection 21 was obtained.

Recording and reproduction tests were performed by setting the optical probe element 20 in the recording and reproduction apparatus shown in FIG. 4. The test conditions were the same as those mentioned above. As a result, a crystalline region of about 10 nm was formed, and satisfactory recording and reproduction were performed.

The following description discusses a variation of the optical probe element 20.

Figure 14:
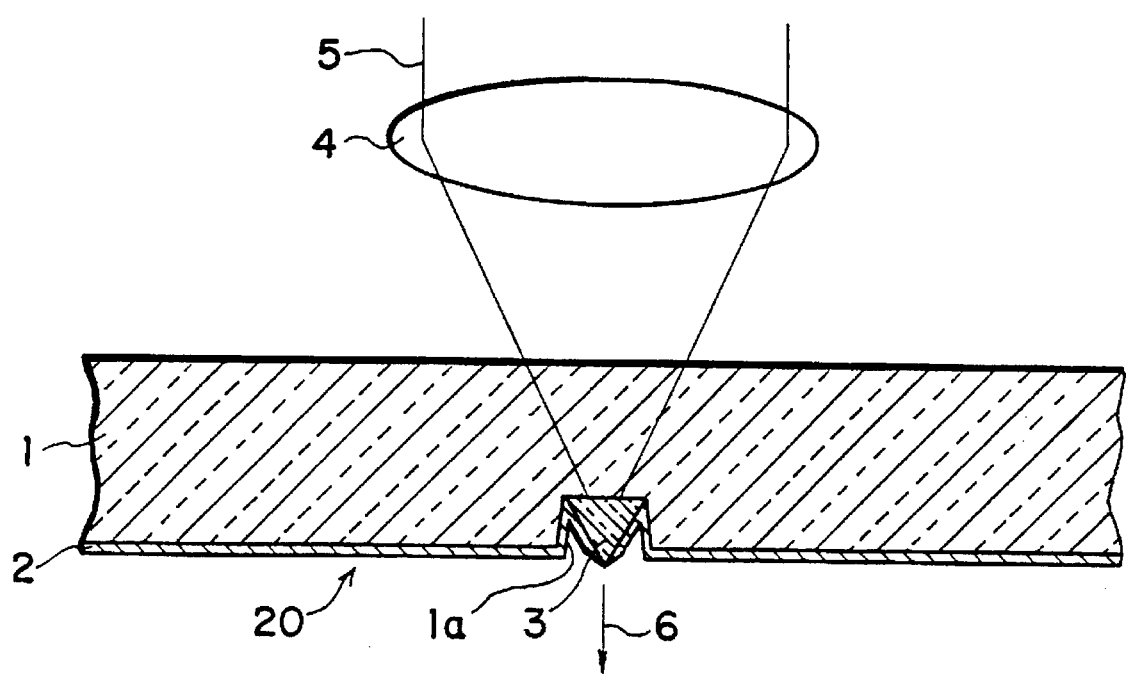
FIG. 14 is an explanatory view illustrating a schematic structure of another optical probe element in the recording and reproduction apparatus of FIG. 1.

As illustrated in FIG. 14, an optical probe element 20 ($P_2$) includes the optical probe 3 formed in a recession 1a in the flat substrate 1. On the other hand, the above-mentioned optical element 20 ($P_1$) includes the optical probe 3 which sticks out from one of the surfaces of the flat substrate 1 (see FIG. 2).

Therefore, in addition to the function and effect of the optical probe element 20 ($P_1$), the optical probe element 20 ($P_2$) produces another effect, i.e., reduces the possibility that the optical probe 3 gets damaged by contact. Consequently, the optical probe element 20 is more easily handled.

A manufacturing method of the optical probe element 20 ($P_2$) is discussed below.

Figure 15A:
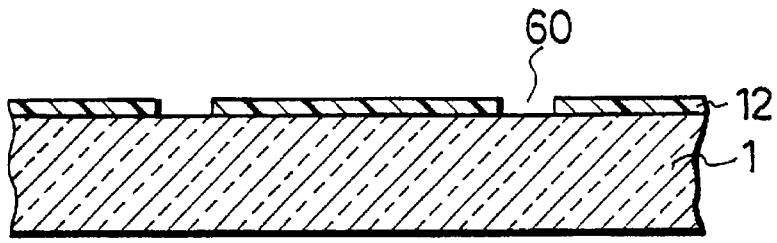
FIGS. 15(a) to 15(e) are views illustrating processes in a manufacturing method of the optical probe element of FIG. 14.
Figure 15B:
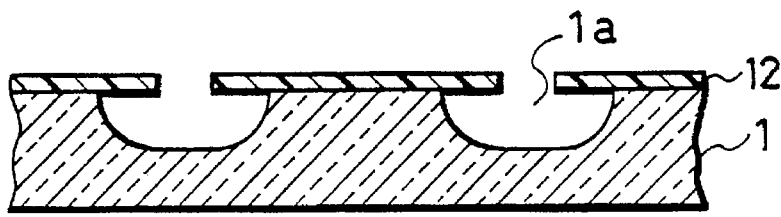
Figure 15C:
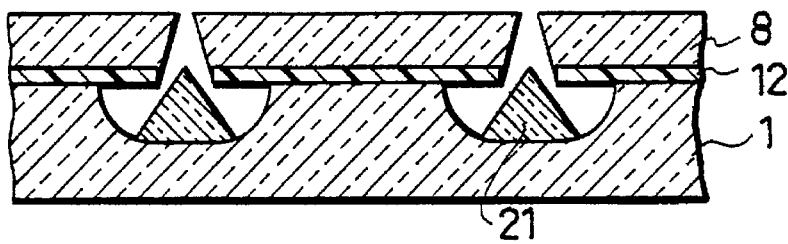

With a manufacturing method ($P_{21}$), as illustrated in FIGS. 15(a) to 15(e), a mask 12 is formed by a photoresist on one of the surfaces of the flat substrate 1 so that a portion where the optical probe 3 is to be formed is exposed (see FIG. 15(a)). The diameter of a portion 60 of the flat substrate 1 where the mask 12 is not formed is between 1 and 5 μm as to be described below. The recession 1a is formed by isotropy-etching the flat substrate 1 (see FIG. 15(b)). At this time, not only the portion 60 is etched, but also portions of the flat substrate 1 under the mask 12 located near the portion 60 are also under-etched.

Next, a transparent dielectric material is sputtered. As a result, a transparent film 8 made from the transparent dielectric material is formed on the mask 12, and the substantially conical sharp-pointed projection 21 made from the transparent dielectric material is formed in the recession 1a (see FIG. 15(c)). Namely, particles of the transparent dielectric material are deposited on the recession 1a from various directions to form the projection 21.

Figure 15D:
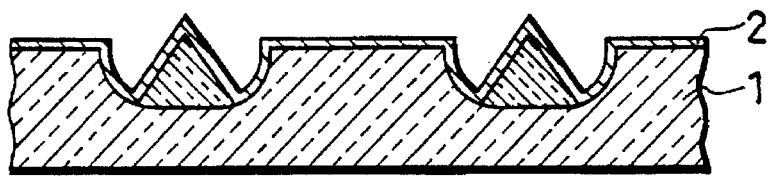
Figure 15E:
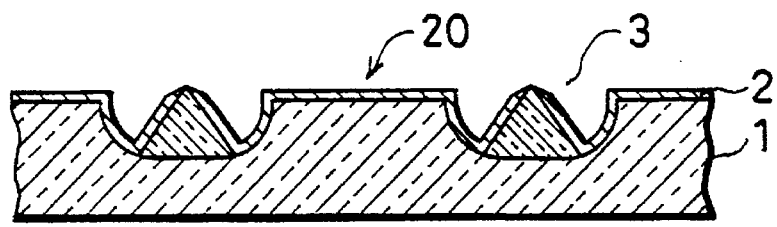

After removing the mask 12 and the transparent film 8, the reflective film 2 is formed on the surface of the flat substrate on which the projection 21 is formed (see FIG. 15(d)). Then, the reflective film 2 on the tip of the projection 21 is removed (see FIG. 15(e)). As a result, the optical probe 3 is formed on the flat substrate 1.

With the manufacturing method ($P_{21}$), the optical probe element 20 is efficiently mass-produced in the recession 1a.

With the manufacturing method ($P_{21}$), in order to efficiently focus the light by the optical probe 3, it is desirable to form the portion 60 in the shape of a circle. Also, in order to form the substantially conical sharp-pointed projection 21, the diameter of the portion 60 is desirably set between 1 and 5 μm.

The transparent dielectric material is desired to be identical to the material (for example, $SiO_2$, SiO) used for the flat substrate 1. However, AlN, $Si_3N_4$, $TiO_2$ may also be used.

A specific example of the manufacturing method ($P_{21}$) is discussed below.

The mask 12 with a thickness of 1 μm was formed by a photoresist on one of the surfaces of the flat substrate 1 made of quarts glass so that only the flat portion 60 in the shape of a circle with a diameter of 2 μm of the flat substrate 1 was exposed. The recession 1a was formed by performing isotropy etching by wet etching using buffer hydrofluoric acid. Next, the transparent film 8 with a thickness of 5 μm was formed on the mask 12 and the projection 21 was formed in the recession 1a by sputtering $SiO_2$. The reflective film 2 of W (tungsten) was formed after removing the mask 12 and the transparent film 8. The reflective film 2 on the tip of the projection 21 was removed by performing electrolytic etching. As a result, the optical probe 3 having an opening with a diameter of about 5 nm at the tip of the projection 21 was obtained.

Recording and reproduction tests were performed by setting the optical probe element 20 in the recording and reproduction apparatus shown in FIG. 1. The test conditions were the same as those mentioned above. Here, the recording layer 302 with a film thickness of 20 nm was used. As a result, a crystalline region of about 5 nm was formed, and satisfactory recording and reproduction were performed.

Unlike the manufacturing method ($P_{21}$), with a manufacturing method ($P_{22}$), as illustrated in FIGS. 16(a) to 16(f), anisotropy etching is performed (see FIG. 16(b)) after forming the mask 12 (see FIG. 16(a)).

The subsequent processes shown in FIGS. 16(c) to 16(f) are identical to the processes shown in FIGS. 15(b) to 15(e) of the manufacturing method ($P_{21}$).

With the manufacturing method ($P_{22}$), since isotropy etching is performed after anisotropy etching, the recession 1a is formed more precisely than with the manufacturing method ($P_{21}$).

A specific example of the manufacturing method ($P_{22}$) is discussed below.

The mask 12 with a thickness of 4 μm was formed by a photoresist on one of the sides of the flat substrate 1 made of quarts glass so that only the portion 60 in the shape of a circle with a diameter of 3 μm of the flat substrate 1 was exposed. Anisotropy etching was performed to the depth of 3 μm by dry etching using $CF_4$. Then, the recession 1a with a depth of 5 μm was formed by performing isotropy etching by wet etching using buffer hydrofluoric acid. Next, the transparent film 8 with a thickness of 5 μm was formed on the mask 12 and the projection 21 was formed in the recession 1a by sputtering $SiO_2$. The reflective film 2 of W (tungsten) was formed after removing the mask 12 and the transparent film 8. The reflective film 2 on the tip of the projection 21 was removed by performing electrolytic etching. As a result, the optical probe 3 having an opening with a diameter of about 5 nm at the tip of the projection 21 was obtained.

Recording and reproduction tests were performed by setting the optical probe element 20 in the recording and reproduction apparatus shown in FIG. 3. The test conditions were the same as those mentioned above. Here, the recording layer 302 with a film thickness of 20 nm was used. As a result, a crystalline region of about 5 nm was formed, and satisfactory recording and reproduction were performed.

As described above, the optical probe elements 20 ($P_1$ and $P_2$) shown in FIGS. 2 and 14 are manufactured by forming the optical probe 3 on the flat substrate 1 using a semiconductor processing technique. When a number of optical probes 3 are produced on a flat substrate 1' larger than the optical probe element 20, it is possible to cut out a desired number of flat substrate 1 having the optical probe 3. This arrangement enables the standardized optical probe element 20 to be efficiently mass-produced. Moreover, by forming a plurality of standardized optical probes 3 on the flat substrate 1, simultaneous recording and reproduction, and high-speed recording and reproduction are achieved.

The following description discusses a second embodiment of the present invention with reference to FIGS. 17 to 26. The members having the same function as in the above-mentioned embodiment will be designated by the same code and their description will be omitted.

Figure 17:
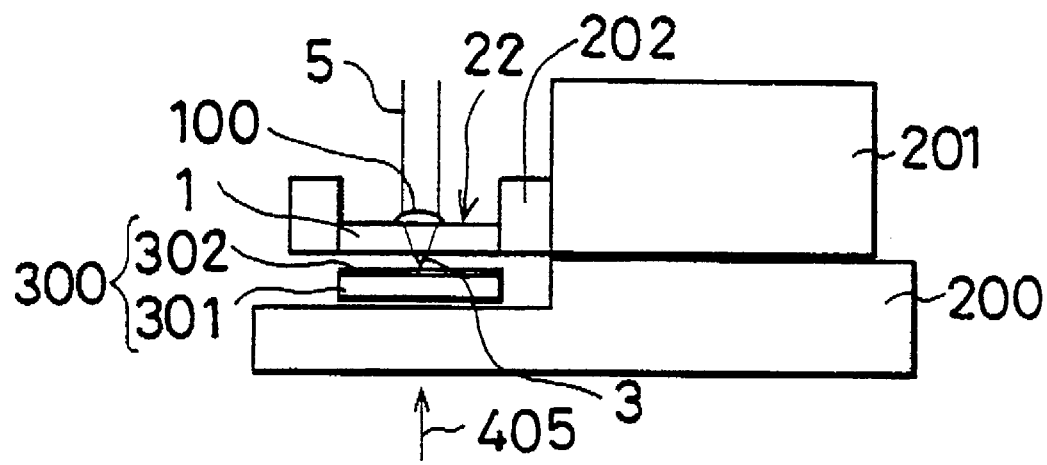
FIG. 17 is an explanatory view illustrating a schematic structure of a recording and reproduction apparatus according to a second embodiment of the present invention.
Figure 18:
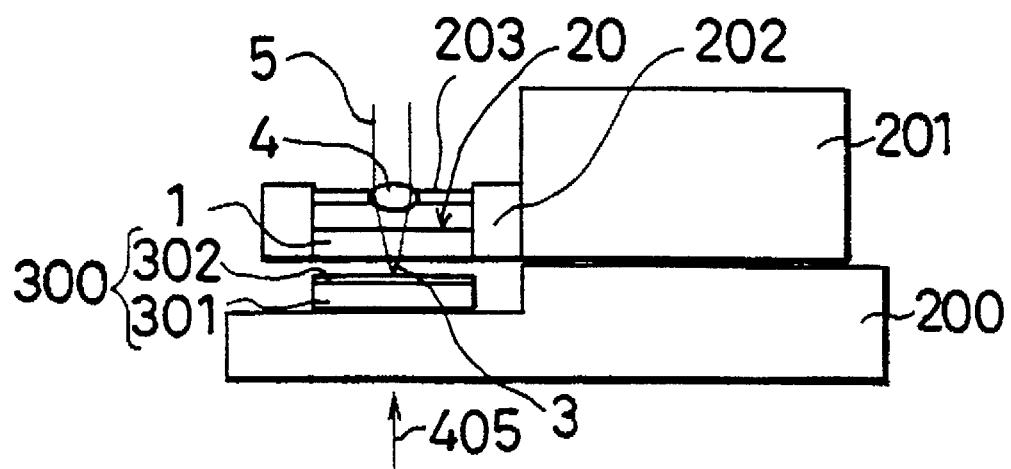
FIG. 18 is an explanatory view illustrating a schematic structure of a comparative example of the recording and reproducing apparatus of FIG. 17.

As illustrated in FIG. 17, a recording and reproduction apparatus of this embodiment includes an optical probe element 22 having a micro lens 100. FIG. 18 shows a recording and reproduction apparatus including the optical probe element 20 having no micro lens 100 as a comparative example.

Figure 19:
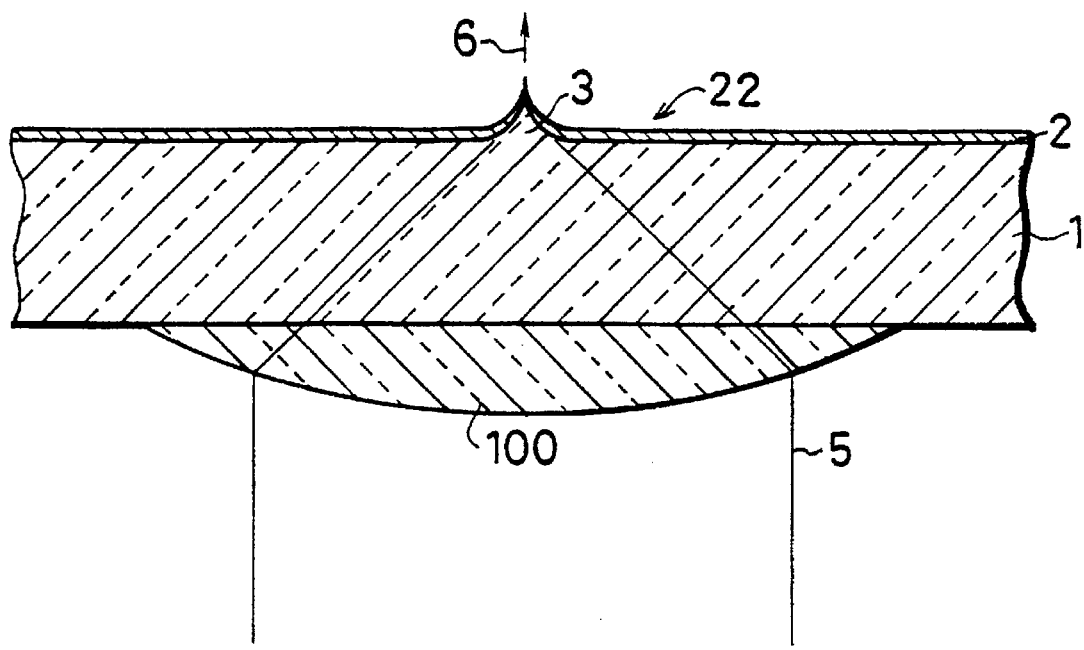
FIG. 19 is an explanatory view illustrating a schematic structure of an optical probe element in the recording and reproduction apparatus of FIG. 17.

As illustrated in FIG. 19, the optical probe element 22 is constructed by (1) a light transmitting flat substrate 1, (2) a substantially conical light transmitting optical probe 3 sticking out from a surface of the flat substrate 1, and (3) the micro lens 100 arranged on a surface of the flat substrate 1 opposite to the surface on which the optical probe 3 is formed so as to be located in a position corresponding to the optical probe 3. The optical probe 3 has a substantially conical light transmitting projection formed to stick out from a surface of the flat substrate 1, and a reflective film 2 which is formed to cover the conical surface of the projection so that the tip of the projection is exposed.

The diameter of the exposed portion of the tip of the optical probe 3 is the order of nm. In order to efficiently converge the parallel light on the optical probe 3 and focus reflected light from the optical probe 3, the micro lens 100 is arranged so that the optical probe 3 is positioned at the focus thereof.

As described above, the recording and reproduction apparatus of this embodiment includes the optical probe element 22 having the micro lens 100 as converging means. It is therefore possible to eliminate the necessity of disposing converging means such as an objective lens outside the optical probe element 22, resulting in a simplified structure.

Figure 20:
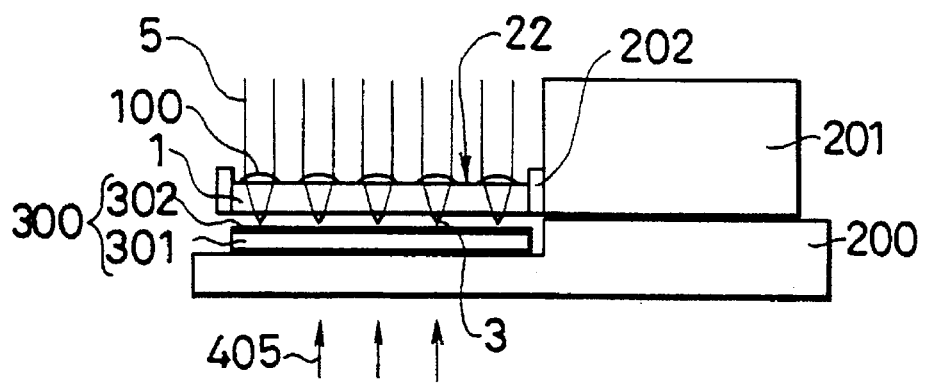
FIG. 20 is an explanatory view illustrating a variation of the recording and reproduction apparatus of FIG. 17, wherein the optical probe element includes a plurality of optical probes.
Figure 21:
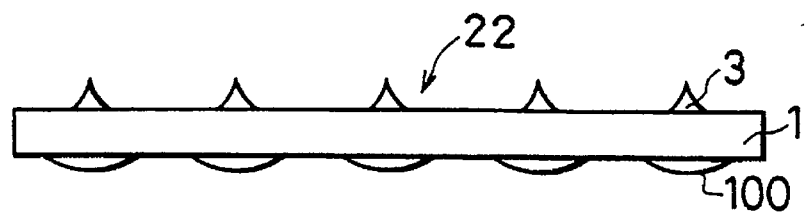
FIG. 21 is a front view illustrating a schematic structure of the optical probe element in the recording and reproduction apparatus of FIG. 20.
Figure 22:
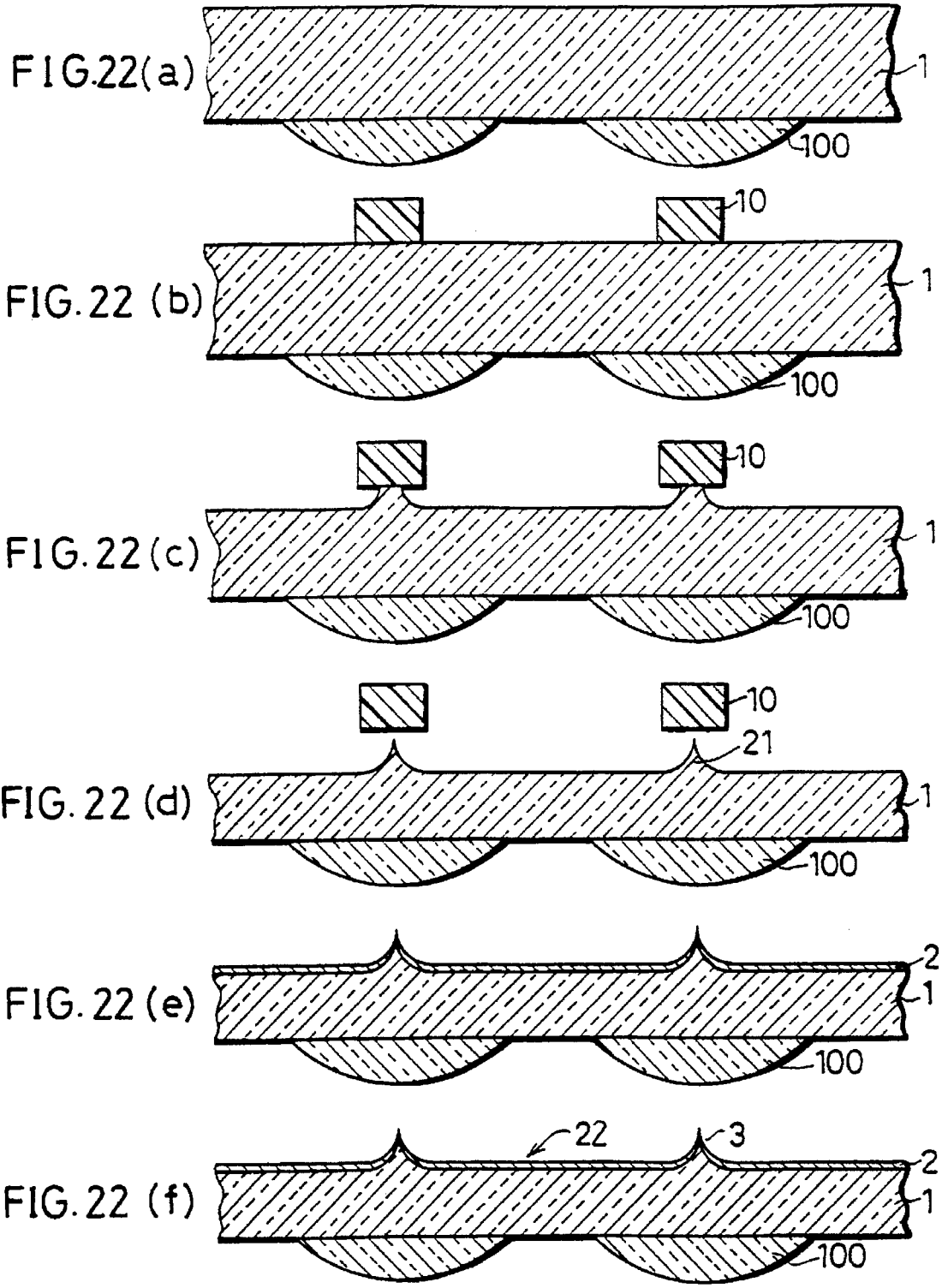
FIGS. 22(a) to 22(f) are views illustrating processes in a manufacturing method of the optical probe element of FIG. 19.

A recording and reproduction apparatus shown in FIG. 20 is a variation of the above-mentioned recording and reproduction apparatus, and includes the optical probe element 22 having a plurality of optical probes 3 and the corresponding number of micro lenses 100. As illustrated in FIG. 21, in the optical probe element 22, the optical probes 3 and the micro lenses 100 are two-dimensionally disposed. It is thus possible to perform high-speed recording and reproduction, simultaneous recording, simultaneous reproduction, or simultaneous recording and reproduction, mentioned in the first embodiment, with a further simplified structure.

When manufacturing the optical probe element 22, as illustrated in FIGS. 22(a) to 22(f), first, the micro lens 100 is arranged on one of the surfaces of the flat substrate 1 (see FIG. 22(a)). Then, the optical probe 3 is formed on a surface of the flat substrate 1 opposite to the surface on which the micro lens 100 is arranged so as to be located in a position corresponding to the center of the micro lens 100. The processes of forming the optical probe 3 shown in FIGS. 22(b) to 22(f) are identical to the processes shown in FIGS. 9(a) to 9(e) of the manufacturing method ($P_{11}$) of the above-mentioned embodiment.

Figure 23:
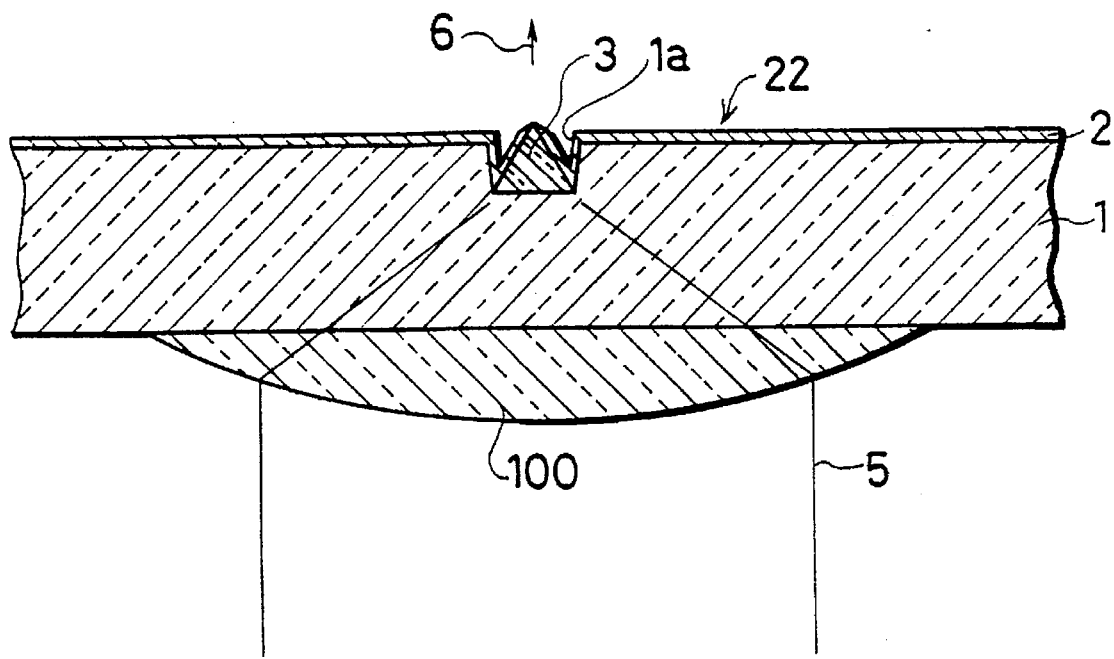
FIG. 23 is an explanatory view illustrating a schematic structure of another optical probe element in the recording and reproduction apparatus of FIG. 17.

The optical probe element 22 shown in FIG. 23 is a variation of the above-mentioned optical probe element 22, and has the optical probe 3 formed in the recession 1a in the flat substrate 1.

Figure 24A:
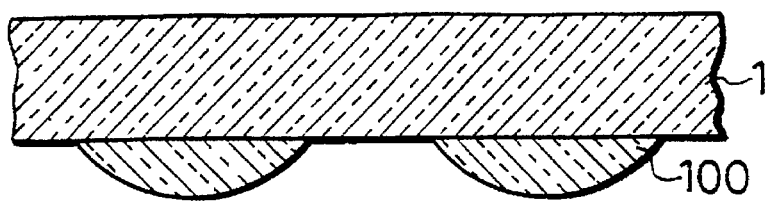
FIGS. 24(a) to 24(f) are views illustrating processes in a manufacturing method of the optical probe element of FIG. 23.
Figure 24B:
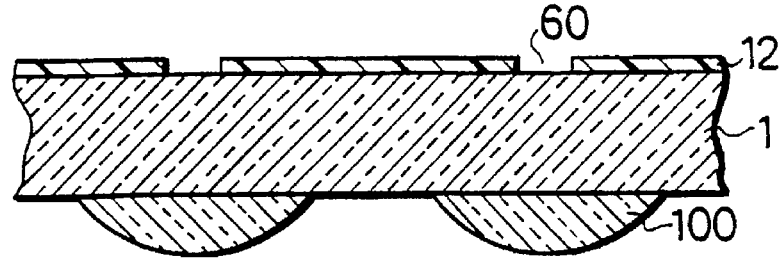
Figure 24C:
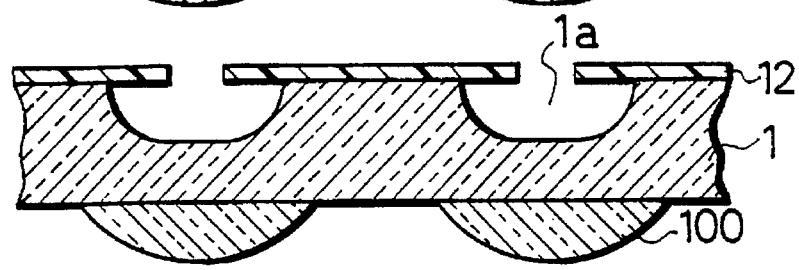
Figure 24D:
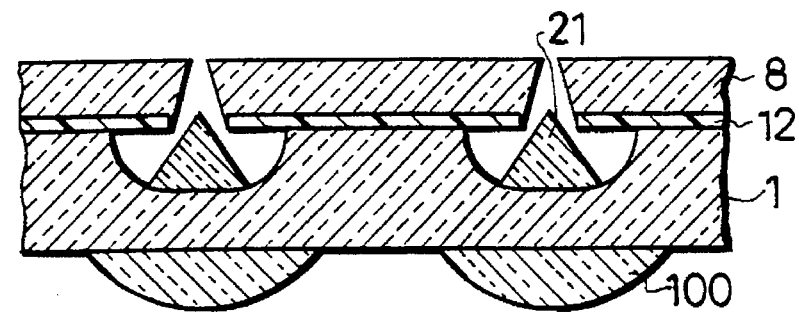
Figure 24E:
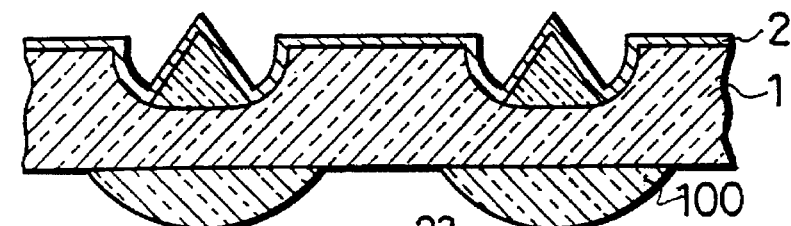
Figure 24F:
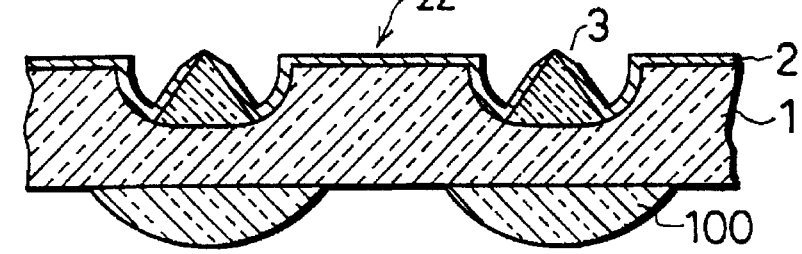

When manufacturing the optical probe element 22, as illustrated in FIGS. 24(a) to 24(f), first, the micro lens 100 is arranged on one of the surfaces of the flat substrate 1 (see FIG. 24(a)). Then, the optical probe 3 is formed on a surface of the flat substrate 1 opposite to the surface on which the micro lens 100 is arranged so as to be located in a position corresponding to the center of the micro lens 100. The processes of forming the optical probe 3 shown in FIGS. 24(b) to 24(f) are identical to the processes shown in FIGS. 15(a) to 15(e) of the manufacturing method ($P_{21}$) of the above-mentioned embodiment.

Figure 25:
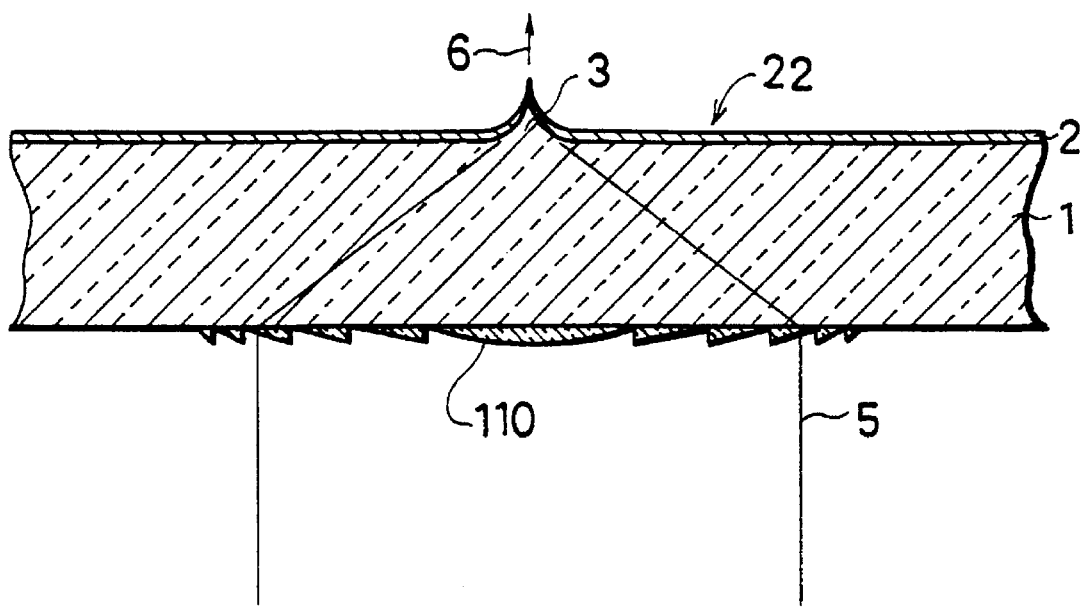
FIG. 25 is an explanatory view illustrating a schematic structure of another optical probe element in the recording and reproduction apparatus of FIG. 17.
Figure 26:
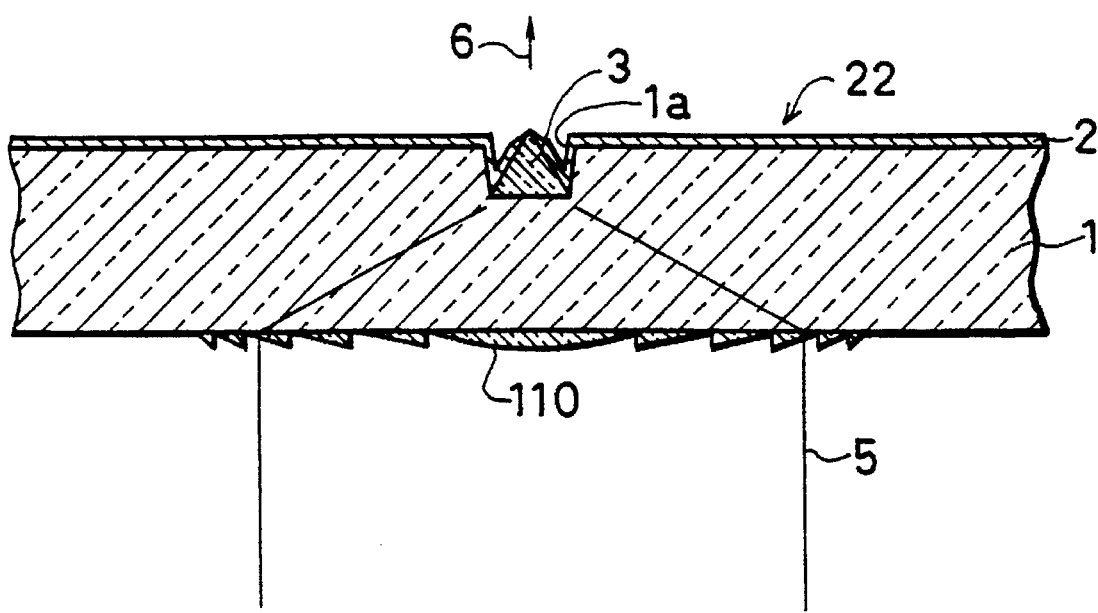
FIG. 26 is an explanatory view illustrating a schematic structure of still another optical probe element in the recording and reproduction apparatus of FIG. 17.
Figure 27:
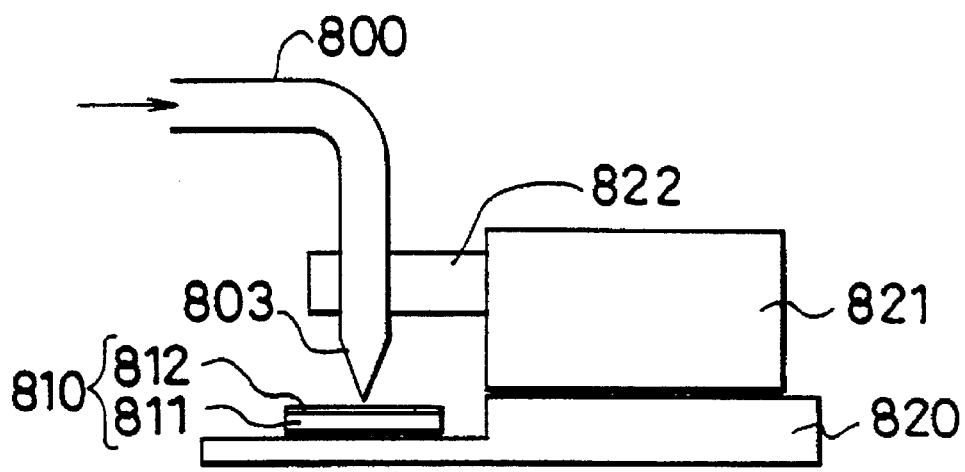
FIG. 27 is an explanatory view illustrating a schematic structure of a conventional recording and reproduction apparatus.
Figure 28:
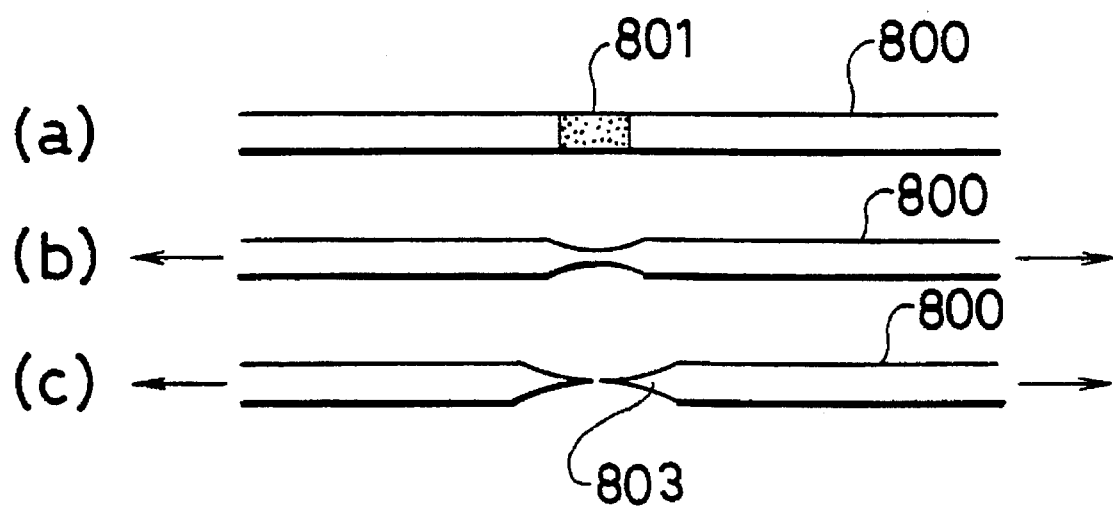
FIGS. 28(a) to 28(c) are explanatory views illustrating processes in a manufacturing method of the optical probe element shown in FIG. 27.

As illustrated in FIGS. 25 and 26, a Fresnel lens 110 may be disposed instead of the micro lens 100 of the optical probe element 22. Like the micro lens 100, in order to efficiently converge the parallel light on the optical probe 3 and focus reflected light from the optical probe 3, the Fresnel lens 110 is arranged so that the optical probe 3 is positioned in the focal point thereof.

With the method of manufacturing the optical probe element 22 of this embodiment, after arranging the micro lens 100 or the Fresnel lens 110 on the flat substrate 1, the processes same as those of the manufacturing method of the above-mentioned embodiment are performed.

Thus, by arranging the micro lens 100 or the Fresnel lens 110 on the flat substrate 1, the optical probe element 22 which does not require external converging means is easily achieved.

Recording and reproduction tests were performed by setting the optical probe element 22 in the recording and reproduction apparatus shown in FIG. 17. The test conditions were the same as those mentioned above. As a result, a crystalline region having a diameter substantially equal to the diameter (i.e., 10 nm) of the opening of the optical probe 3 was formed on the recording layer 302, and satisfactory recording and reproduction were performed.

Additionally, recording and reproduction tests were performed by setting the optical probe element 22 having a plurality of the optical probes 3 in the recording and reproduction apparatus shown in FIG. 20. The test conditions were the same as those mentioned above. As a result, a crystalline region having a diameter substantially equal to the diameter (i.e., 10 nm) of the opening of the optical probe 3 was formed on the recording layer 302, and satisfactory recording and reproduction were performed- Furthermore, simultaneous recording and reproduction of information were carried out by including photodetectors corresponding to the optical probes 3.

As described above, in the optical probe element 22 and in the recording and reproduction apparatus using the optical probe element 22, a plurality of the optical probes 3 are formed on one of the surfaces of the flat substrate 1, and the number of converging means corresponding to the number of the optical probes 3 are arranged on a surface of the flat substrate 1 opposite to the surface on which the optical probes 3 are formed so that the optical probes 3 are positioned at the focus. This arrangement allows the simultaneous recording and reproduction of a plurality pieces of information, and eliminates the need of disposing the converging means such as an objective lens outside the optical probe element 22.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical probe element for focusing light from a light source into light of a diameter not larger than a diffraction limit, comprising:

a light transmitting substrate having a first surface including a plurality of substantially conical projections formed integrally to said substrate as a change of shape in said substrate and a flat section between said projections, and a second surface; and a reflective film formed on a conical surface of each of said projections over an entire surface of each of said projections except for respective tip portions thereof, which are left exposed, wherein a distance in a direction vertical to said flat section of said first surface from said respective tip portions of each of said projections to said flat section of said first surface is substantially uniform, and wherein said respective tip portions are a substantially circular shape and have a substantially uniform diameter.

2. The optical probe element according to claim 1, further comprising converging means, disposed on said second surface for focusing the light onto each of said projections, wherein said converging means are equal in number to said projections.

3. A recording and reproduction apparatus comprising:

a light source; and an optical probe element for converging light from said light source into light having a diameter not larger than a diffraction limit, and for projecting the converged light onto a recording medium, wherein said optical probe element includes a light transmitting flat substrate, wherein a plurality of optical probes are formed integrally to said substrate as a change of shape in said substrate, and said optical probes each include a substantially conical light transmitting projection, and a reflective film which covers a conical surface of said projection so that a respective tip of said projection is exposed, and wherein a distance in a direction vertical to said flat substrate from said respective tip of each of said projections to said flat substrate is substantially uniform, and wherein said respective tip of each said projection is substantially circular in shape and has a substantially uniform diameter.

4. The recording and reproduction apparatus according to claim 3, wherein said optical probe element further comprising converging means, disposed on a surface of said flat substrate opposite to said one surface for focusing the light onto each of said projections.

wherein the number of said converging means is equal to the number of said optical probes.

5. The optical probe element according to claim 1, wherein light is incident upon a surface of said substrate on which said projections are not formed, and light is emitted from the respective tip portions of said projections.

6. The apparatus of claim 3 wherein light is incident upon a surface of said substrate on which said projections are not formed, and light is emitted from each said respective tip of said projections.

7. The optical probe element of claim 1 wherein said substrate consists of light transmissive material.

8. The apparatus of claim 3 wherein said substrate consists of light transmissive material.

* * * * *